US010612652B1

(12) United States Patent
Templin

(10) Patent No.: US 10,612,652 B1
(45) Date of Patent: Apr. 7, 2020

(54) RETURN TO NEUTRAL MECHANISM FOR VARIABLE DRIVE APPARATUS

(71) Applicant: Hydro-Gear Limited Partnership, Sullivan, IL (US)

(72) Inventor: Austin J. Templin, Pittsboro, IN (US)

(73) Assignee: Hydro-Gear Limited Partnership, Sullivan, IL (US)

(*) Notice: Subject to any disclaimer, the term of this patent is extended or adjusted under 35 U.S.C. 154(b) by 871 days.

(21) Appl. No.: 15/076,974

(22) Filed: Mar. 22, 2016

Related U.S. Application Data

(63) Continuation of application No. 14/215,999, filed on Mar. 17, 2014, now Pat. No. 9,341,258.

(60) Provisional application No. 61/791,408, filed on Mar. 15, 2013.

(51) Int. Cl.
  *F16H 61/439* (2010.01)
  *F16H 61/438* (2010.01)
  *F04B 1/26* (2006.01)

(52) U.S. Cl.
  CPC ............ *F16H 61/439* (2013.01); *F04B 1/26* (2013.01); *F16H 61/438* (2013.01)

(58) Field of Classification Search
  CPC ........... F16H 2059/0295; F16H 61/438; F16H 61/439; F04B 1/26
  USPC ......................................................... 60/487
  See application file for complete search history.

(56) References Cited

U.S. PATENT DOCUMENTS

| 6,332,393 | B1 | 12/2001 | Trimble |
| 6,457,546 | B1 | 10/2002 | Ishimaru et al. |
| 6,715,284 | B1 | 4/2004 | Poplawski et al. |
| 7,134,276 | B1 | 11/2006 | Langenfeld et al. |
| 7,197,873 | B1* | 4/2007 | Windhorst .............. F04B 1/324 60/487 |
| 7,454,907 | B1 | 11/2008 | Hauser et al. |
| 7,458,311 | B2 | 12/2008 | Korthals |
| 7,703,376 | B2 | 4/2010 | Mish et al. |
| 7,908,960 | B2 | 3/2011 | Daigre |
| 8,205,539 | B2 | 6/2012 | Kisse et al. |
| 2010/0021325 | A1* | 1/2010 | Kisse ..................... F04B 1/328 417/437 |
| 2012/0275933 | A1* | 11/2012 | Richardson .......... F03C 1/0668 417/212 |
| 2013/0145890 | A1 | 6/2013 | Hynes et al. |

* cited by examiner

*Primary Examiner* — William Kelleher
*Assistant Examiner* — Randell J Krug
(74) *Attorney, Agent, or Firm* — Neal, Gerber & Eisenberg LLP

(57) ABSTRACT

A return to neutral (RTN) mechanism for a variable drive apparatus having a rotatable control shaft is provided. The RTN mechanism incorporates a neutral lockdown plate secured to the housing of the variable drive apparatus and disposed about the rotatable control shaft, a control arm fixed to the control shaft to impart rotation thereto, a single, rotatable return arm piloted upon a protective cover, and a pair of springs to bias the control shaft back to a neutral position from either a forward or reverse rotation.

20 Claims, 20 Drawing Sheets

RETURN TO NEUTRAL MECHANISM FOR VARIABLE DRIVE APPARATUS

CROSS REFERENCE

This application claims priority to U.S. patent application Ser. No. 14/215,999, filed on Mar. 17, 2014, which claims priority to U.S. Provisional Patent Application Ser. No. 61/791,408 filed on Mar. 15, 2013. The contents of the prior applications are incorporated herein by reference in their entireties.

BACKGROUND OF THE INVENTION

This invention relates generally to control mechanisms for variable drive apparatus and, more particularly, to a speed adjustment assembly incorporating a return to neutral mechanism (RTN mechanism).

Variable drive apparatus, whether hydrostatic, toroidal, friction, or the like, will generally have a control shaft whose rotation, via manipulation of an operator control mechanism mechanically linked to the control shaft, regulates the output of the variable drive apparatus. In the description that follows, the various RTN mechanisms disclosed herein will, by way of example only, be applied to a hydraulic apparatus. It will be understood, however, that the present invention may similarly be applied to any variable drive apparatus having a rotatable control shaft.

Many variable drive apparatus have a rotatable control shaft extending out from a housing to permit adjustment of the volume and direction of hydraulic fluid flow through a hydraulic circuit, e.g. axial piston pumps, radial piston pumps, and integrated hydrostatic transmissions. In the case of an axial piston pump, a trunnion arm or shaft extending from the housing may be rotated to adjust the angular position of a swash plate. The angular position of the swash plate is known to control the volume and direction of the pump's outflow by adjusting the stroke of the pump's pistons as disclosed in U.S. Pat. No. 6,332,393, incorporated herein by reference in its entirety. Rotation of the trunnion arm or shaft in a first direction will produce a flow of hydraulic fluid in a first direction through a hydraulic circuit, while rotation of the trunnion arm or shaft in the opposite sense will produce a flow of hydraulic fluid through the hydraulic circuit in the opposite direction. In between these rotational positions there exists a neutral state where the axial piston pump is known to have zero displacement. In a hydraulic circuit where the axial piston pump is paired with a hydraulic wheel motor, e.g. in a utility vehicle, the neutral state represents a condition where the vehicle is stopped and does not creep in any particular direction. This is a necessary condition for predictable vehicle operation.

In the past, various means have been utilized for returning a hydraulic apparatus to a neutral state once an operator applied force is removed from the control shaft linkage, e.g. use of a torsion spring acting upon a control arm engaged to the trunnion arm or shaft. More recently, 'scissors' style RTN mechanisms have been applied to the rotatable control shafts of hydraulic pumps, integrated hydrostatic transmissions and transaxles, as disclosed in U.S. Pat. Nos. 6,715, 284 and 7,134,276, which are incorporated herein by reference in their entirety. While scissors style RTN mechanisms may bring greater flexibility to the manner in which an RTN mechanism may be applied to a hydraulic apparatus, the cumulative machining tolerances of the components of a scissors style RTN mechanism may introduce a certain amount of hysteresis to the control linkage, delaying vehicle responsiveness or permitting vehicle creep. This can occur because combinations of machining tolerances at opposing limits may result in play between stops on fixed components and mating surfaces on rotating components of a scissors RTN mechanism. If a control arm engaged to the trunnion arm or shaft has some degree of free play before contacting a scissor return arm, a reproducible neutral setting will be difficult to achieve and maintain.

SUMMARY OF THE INVENTION

An improved speed adjustment assembly incorporating an RTN mechanism that minimizes hysteresis and its accompanying effects is introduced herein. In addition, the invention provides the option of having differing return forces in the forward and reverse directions. As applied to a vehicle, a manufacturer may beneficially elect to employ a lighter return force in the forward direction to reduce operator fatigue in the predominate direction of operation. This is particularly true, for instance, when applying the RTN mechanism to a single-axle, integrated hydrostatic transaxle, such as those disclosed in U.S. Pat. Nos. 6,715,284 and 7,134,276. Transaxles of this type are typically applied in pairs to zero-turn vehicles, wherein a vehicle operator may be required to constantly apply a force to hand levers to adjust the stroke of the transaxles' pumps. This invention also provides manufacturers with the option of completely eliminating one of the return forces.

One of skill in the art will understand that the basic components of the speed adjustment assembly disclosed in this specification also cooperate to provide the return to neutral function. Consequently, where statements reference the assembly absent any particular function, the term 'RTN mechanism' will be generically used.

A first embodiment of an RTN mechanism in accordance with the principles of the invention features a neutral lockdown plate secured to the housing of the hydraulic apparatus and disposed about the rotatable control shaft, a control arm fixed to the control shaft to impart rotation thereto, a single, rotatable return plate piloted upon a protective cover, and a pair of springs to bias the control shaft back to a neutral position from either a forward or reverse rotation. In this embodiment, the springs are operationally disposed along an arc formed by the perimeters of the neutral lockdown plate, the control arm, and the return plate.

A second embodiment of an RTN mechanism features a neutral lockdown plate secured to the housing of the hydraulic apparatus and disposed about the rotatable control shaft, a control arm fixed to the control shaft to impart rotation thereto, a single, rotatable return arm piloted upon a 'top hat' cover, and a pair of springs to bias the control shaft back to a neutral position from either a forward or reverse rotation. In this embodiment, the springs are linearly disposed between the various arms comprising the RTN mechanism.

A third embodiment of an RTN mechanism is a variant of the second embodiment, wherein the single, rotatable return arm is piloted upon a bushing trapped between various elements of the RTN mechanism.

A fourth embodiment of an RTN mechanism is substantially similar to the second and third embodiments, but varies in that the neutral lockdown plate is piloted upon the housing itself and not the rotatable control shaft, providing the advantage of retaining a factory set neutral position in the event the control shaft seal requires replacement or other repairs are necessary.

A fifth embodiment of an RTN mechanism is similar to the fourth embodiment, in that the neutral lockdown plate is piloted upon the housing, but varies primarily in the compact arrangement of the return springs and the attachment of one end of each return spring to a common spring catch arm.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
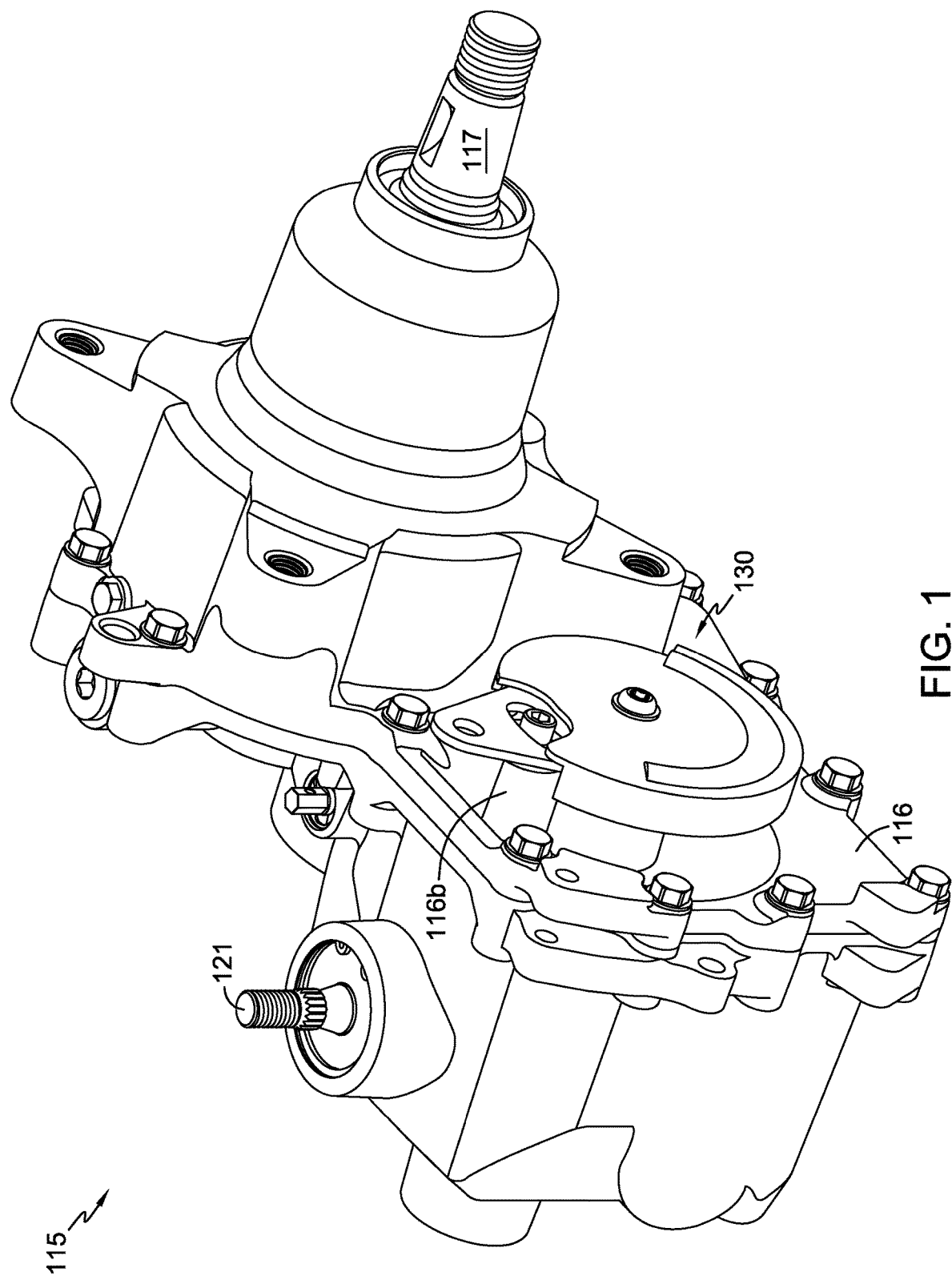
FIG. 1 is a perspective view of a representative hydrostatic transaxle having a first embodiment of an RTN mechanism in accordance with the principles of the invention.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 2:
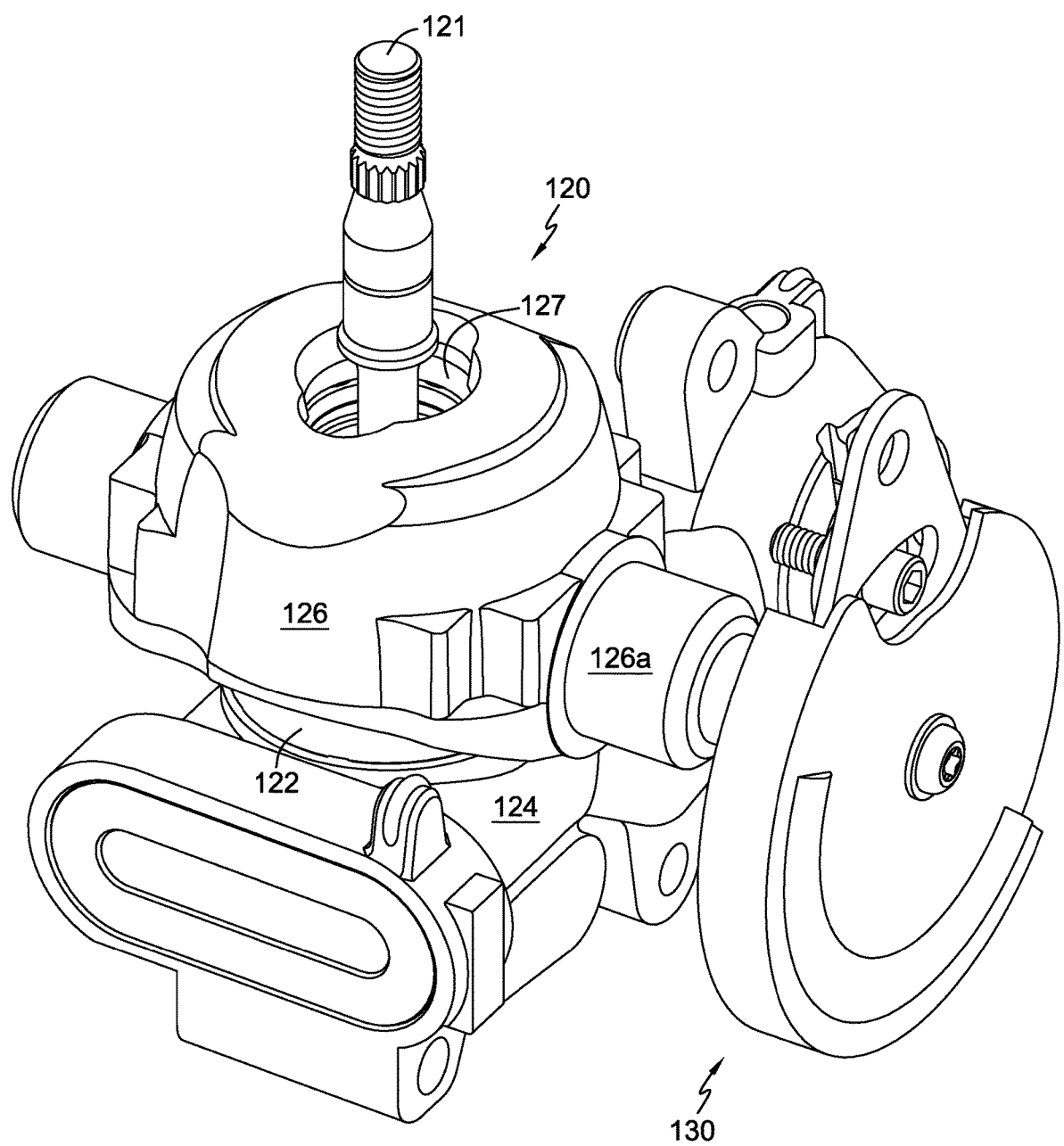
FIG. 2 is a perspective view of the RTN mechanism and hydrostatic transaxle of FIG. 1, wherein the housing and other components of the hydrostatic transaxle are removed to illustrate the incorporated axial piston pump assembly and center section.

FIG. 1 shows a representative hydrostatic transaxle 115 having a first embodiment of an RTN mechanism 130 in accordance with the principles of the invention. Transaxle 115 has a single axle shaft 117 as its output and is suitable for application to a zero-turn vehicle, such as a zero-turn mower (not shown). In such a vehicle, transaxle 115 would independently power one of two drive wheels, controlling both the speed and rotational direction of the wheel. Transaxle 115 is similar in form and function to the transaxles disclosed in U.S. Pat. Nos. 6,715,284 and 7,134,276, whose details will not be further discussed. The input shaft 121 of transaxle 115 can be powered by a prime mover (not shown), such as an internal combustion engine or electric motor, typically by means of a belt and pulley system (not shown). Transaxle 115 operates on the principle of input shaft 121 driving a hydraulic pump assembly 120 rotationally supported on a ported center section 124, as shown in FIG. 2. As depicted, hydraulic pump assembly 120 is an axial piston pump having a plurality of pistons (not shown) axially disposed in a cylinder block 122 engaged to input shaft 121, to rotate therewith when input shaft 121 is driven by the prime mover. The porting in center section 124 provides fluid communication between hydraulic pump assembly 120 and a hydraulic motor assembly (not shown) which is also rotationally supported on center section 124. Through the reciprocating action of its pistons, hydraulic pump assembly 120 pumps hydraulic fluid to the hydraulic motor assembly to cause the rotation of a motor shaft (not shown). The rotation of the motor shaft is eventually transferred through a reduction gear train (not shown) to drive axle shaft 117.

Figure 7:
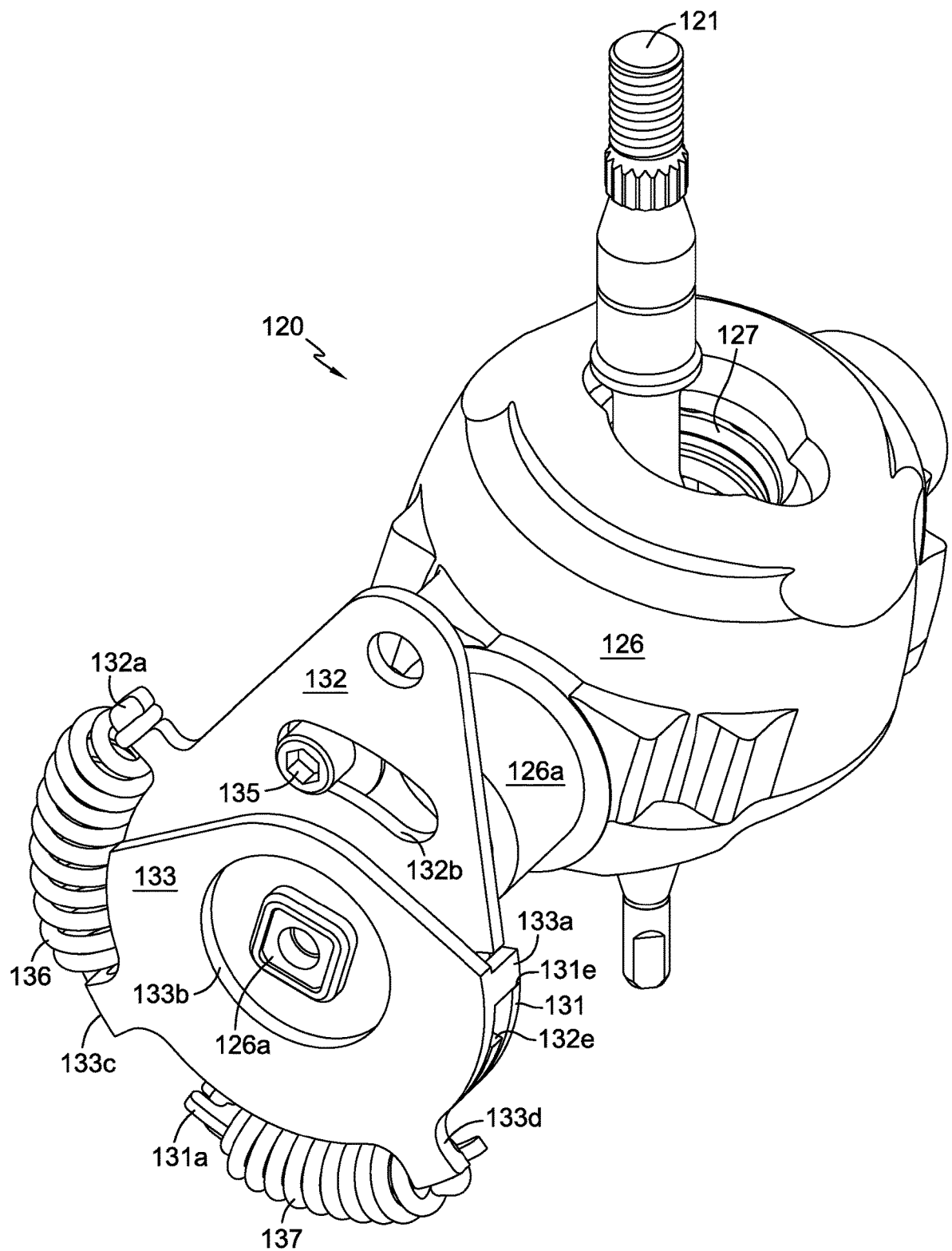
FIG. 7 is a perspective view of the components shown in FIG. 5, with the control arm of the RTN mechanism in the forward position.
Figure 8:
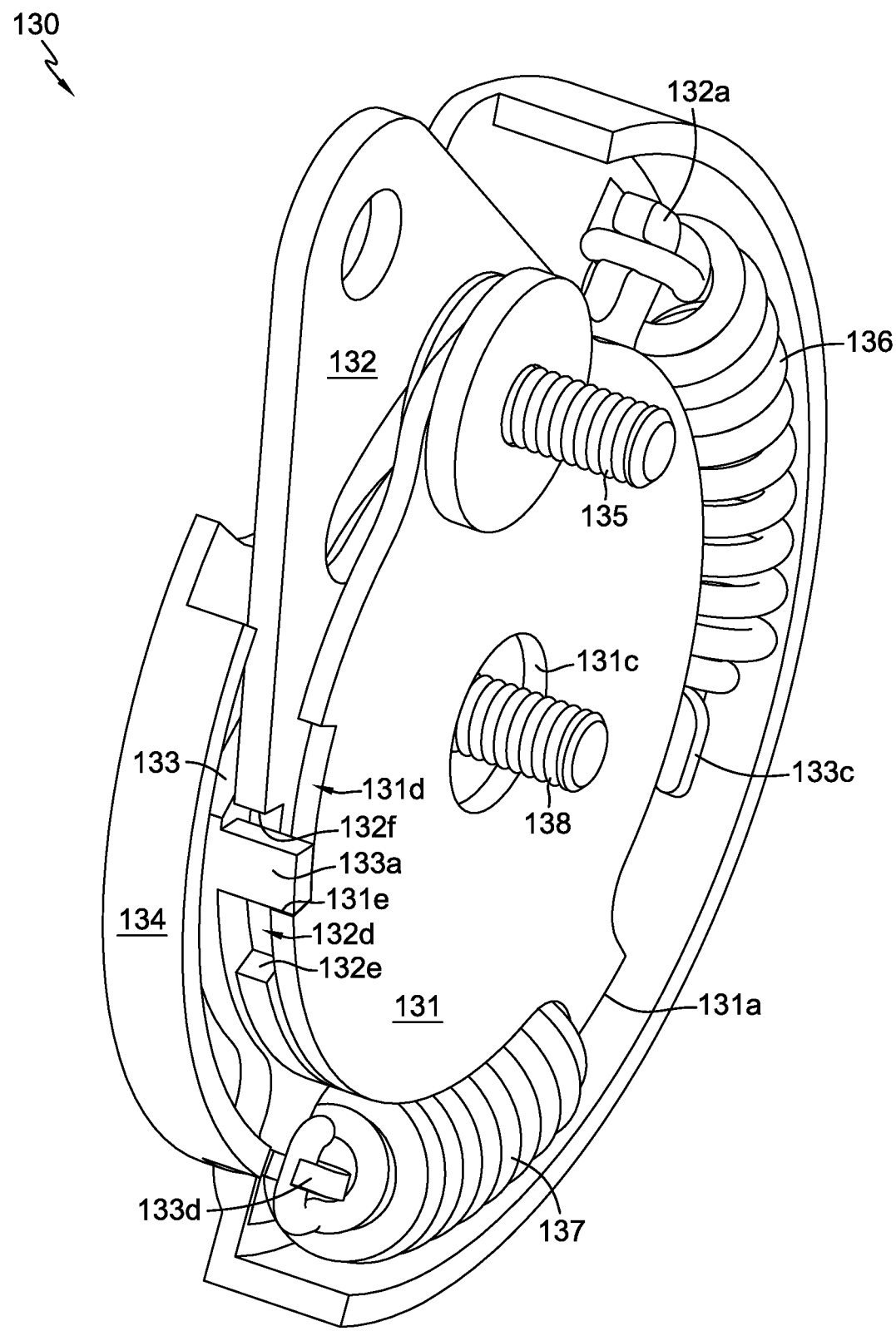
FIG. 8 is a perspective view of the RTN mechanism shown in FIG. 7 rotated 90°, with the RTN cover and mounting screw included.

For adjusting the speed and rotational direction of axle shaft 117, hydraulic pump assembly 120 includes a rotatable swash plate 126 having a thrust bearing 127 against which the pump pistons travel. In the neutral position, swash plate 126 and its thrust bearing 127 are oriented perpendicular to the longitudinal axes of the pump pistons, whereby reciprocation of the pump pistons is arrested. As is understood in the art, swash plate 126 may be rotated within a limited range to either side of a neutral position to vary the stroke or displacement of the pump pistons and the direction of hydraulic fluid flow to the hydraulic motor assembly. As the stroke of the pump pistons is varied, the volume of the hydraulic fluid pumped through the hydraulic porting of center section 124 will vary, altering the rotational speed of axle shaft 117. The greater the rotation angle of swash plate 126 away from the neutral position, the greater the volume of hydraulic fluid displaced, and the greater the rotational speed of axle shaft 117. The rotational direction of axle shaft 117 is dependent upon the direction of hydraulic fluid flow through the porting of center section 124, and is controlled by the direction the swash plate 126 is rotated away from its neutral position. When viewed from the external end of the integral trunnion shaft 126a that rotationally supports swash plate 126 in housing 116 of transaxle 115, a clockwise rotation of swash plate 126 about the axis of trunnion shaft 126a, as depicted in FIGS. 7 and 8, shall be considered the 'forward' direction throughout this specification (i.e. imparting a forward rotation to axle shaft 117). It will be appreciated by one of skill in the art that whether the position of swash plate 126 shown in FIGS. 7 and 8 will drive axle shaft 117 in the forward or reverse direction depends upon the hydraulic circuit configuration and the direction of rotation of input shaft 121.

Figure 3:
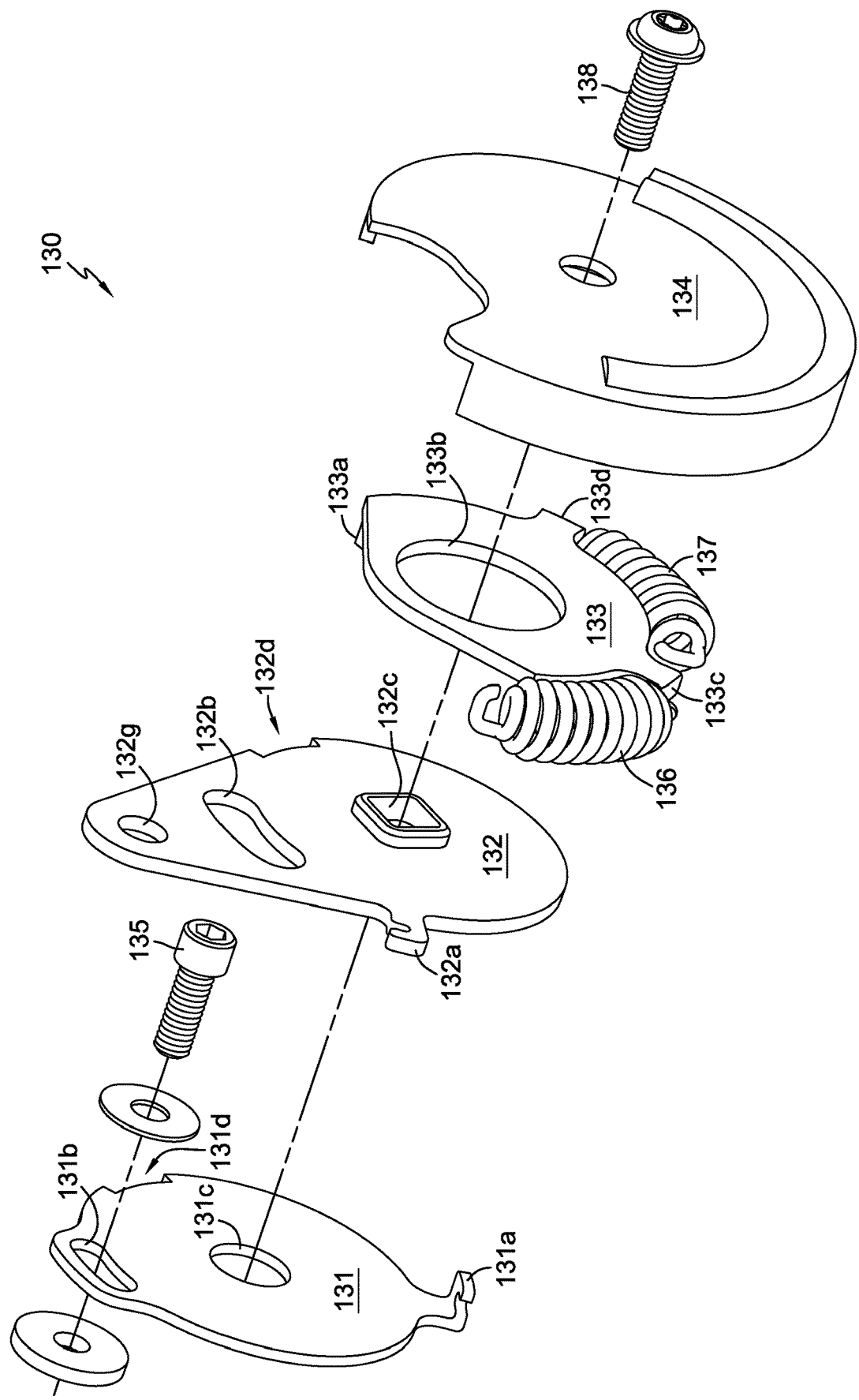
FIG. 3 is an exploded view of the RTN mechanism shown in FIG. 1.
Figure 4:
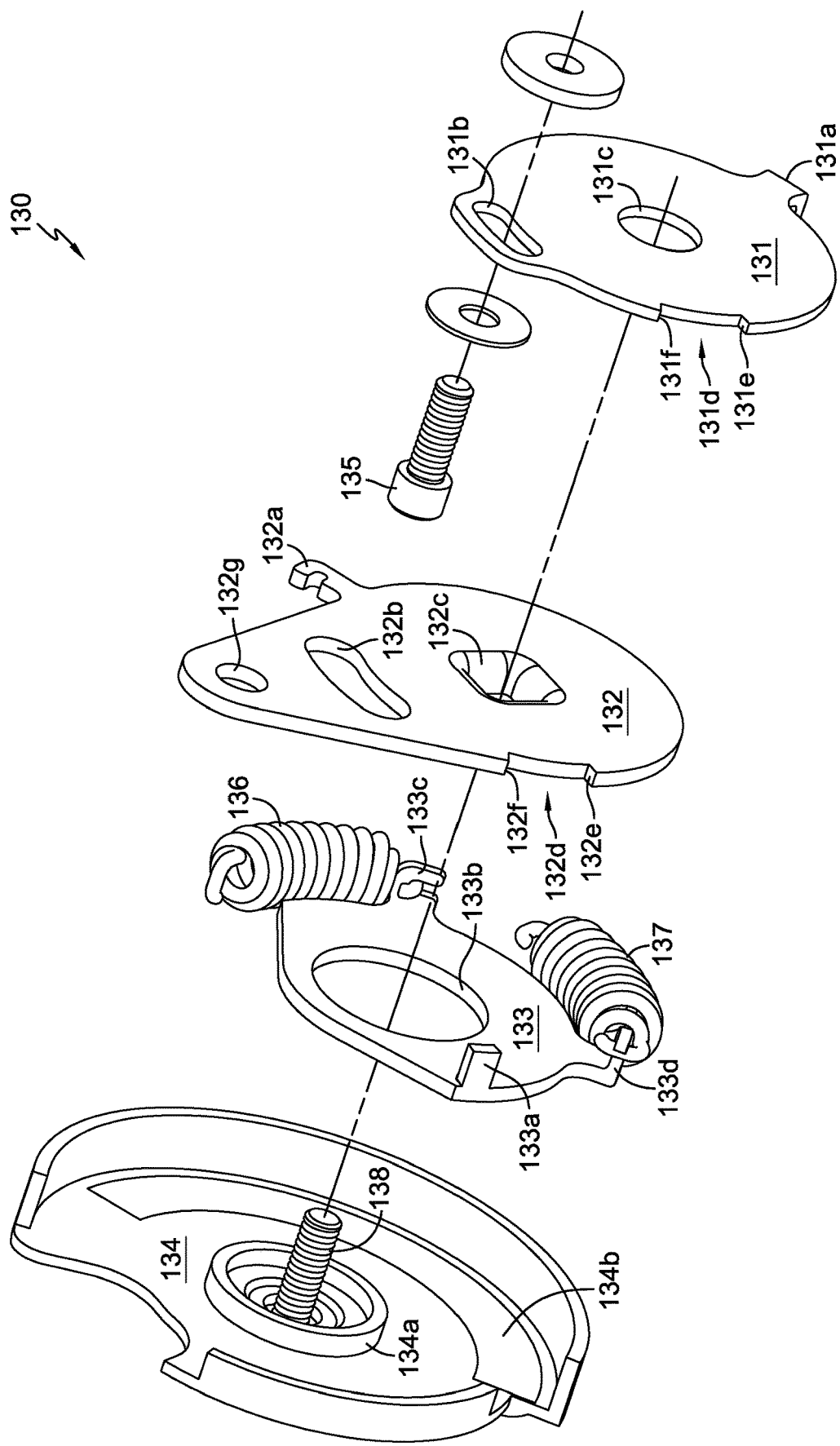
FIG. 4 is an exploded view of the RTN mechanism shown in FIG. 3, rotated 180°.
Figure 5:
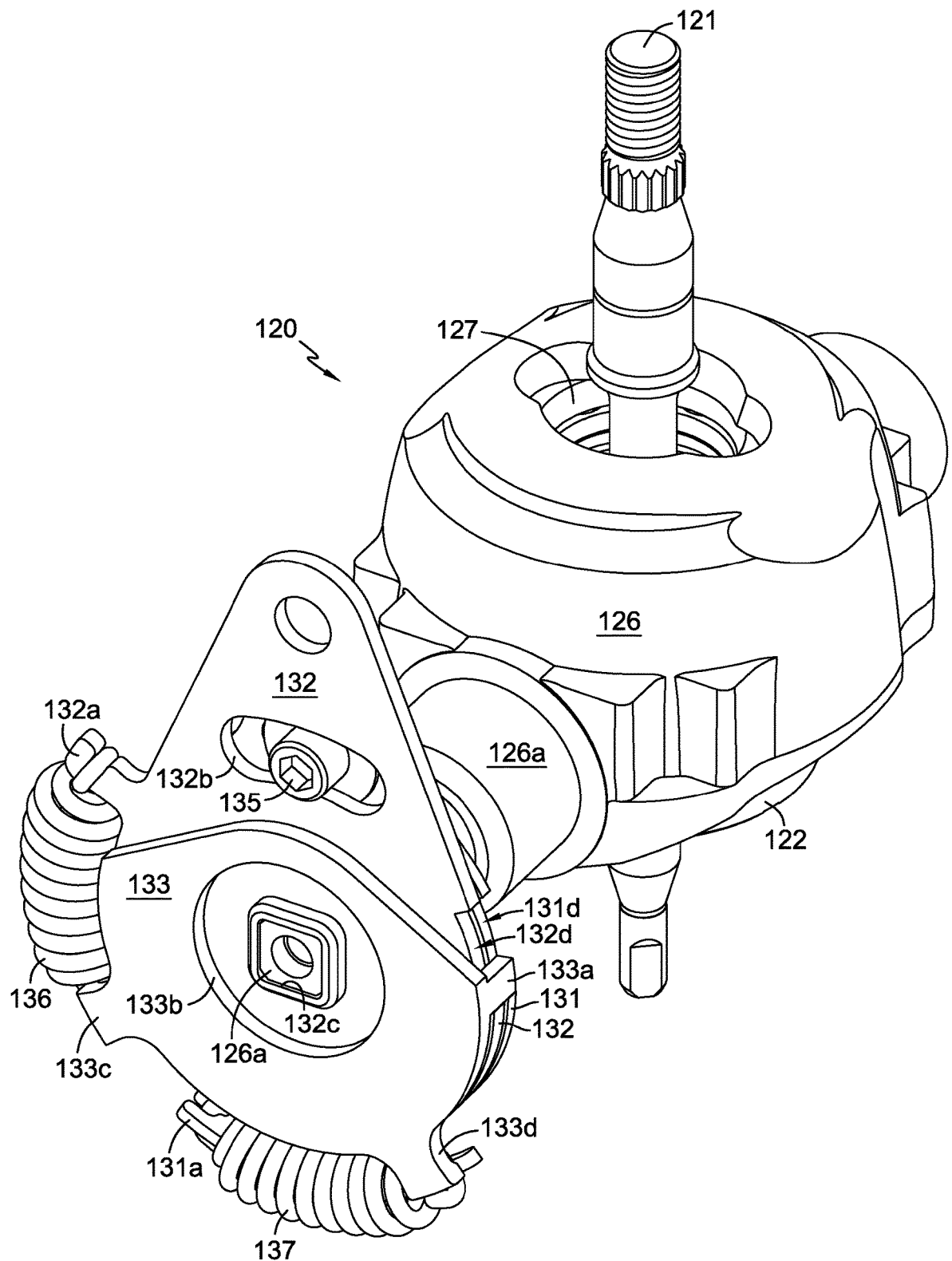
FIG. 5 is a perspective view of the axial piston pump assembly and RTN mechanism shown in FIG. 2, with the center section, RTN cover, and mounting screw removed for clarity, and the control arm of the RTN mechanism in the neutral position.

To rotate trunnion shaft 126a and, accordingly, swash plate 126, a control arm 132 is coupled to trunnion shaft 126a, as shown in FIG. 5. As depicted, a tapered-square opening 132c formed in the control arm 132 engages a corresponding feature at the end of trunnion shaft 126a (as best shown on corresponding trunnion shaft 426a in FIG. 15). Other interfaces known in the art are contemplated within the scope of the invention provided control arm 132 and trunnion shaft 126a are non-rotatably engaged. Control arm 132 may be connected to an operator control, such as a hand lever or foot pedal provided on a vehicle, via a linkage (not shown) engaged to opening 132g (as best shown in FIGS. 3 and 4). Consequently, movement of the operator control is translated to the control arm 132 to cause the rotation of trunnion shaft 126a, and thus swash plate 126. While swash plate 126 is depicted as having an integral trunnion shaft 126a, it should be understood that other means for rotation of a swash plate, such as the separable trunnion arm depicted in U.S. Pat. No. 6,332,393, can be controlled by RTN mechanism 130.

For use in returning swash plate 126 to its neutral position, RTN mechanism 130, illustrated more clearly in FIGS. 3 and 4, includes a neutral lockdown plate 131, control arm 132, return arm 133, protective cover 134, and a pair of bias springs 136, 137. Neutral lockdown plate 131, which is piloted about trunnion shaft 126a, is fastened with a neutral set screw 135 to a boss 116b formed on housing 116 proximate to trunnion shaft 126a. In this embodiment, the return arm 133 is in the general shape of a plate and may be referred to herein as return plate 133. A mounting screw 138, which mates with corresponding threads (not shown) in the end of the trunnion shaft 126a, retains control arm 132, return plate 133, and protective cover 134 on trunnion shaft 126a. As will be described in greater detail below, RTN mechanism 130 will be initially assembled about trunnion shaft 126a, rotatably positioned, and then secured in place to establish the neutral position of swash plate 126. RTN mechanism 130 then functions to bias and move swash plate 126 towards its neutral position in the absence of an operator control input to trunnion shaft 126a.

Figure 9:
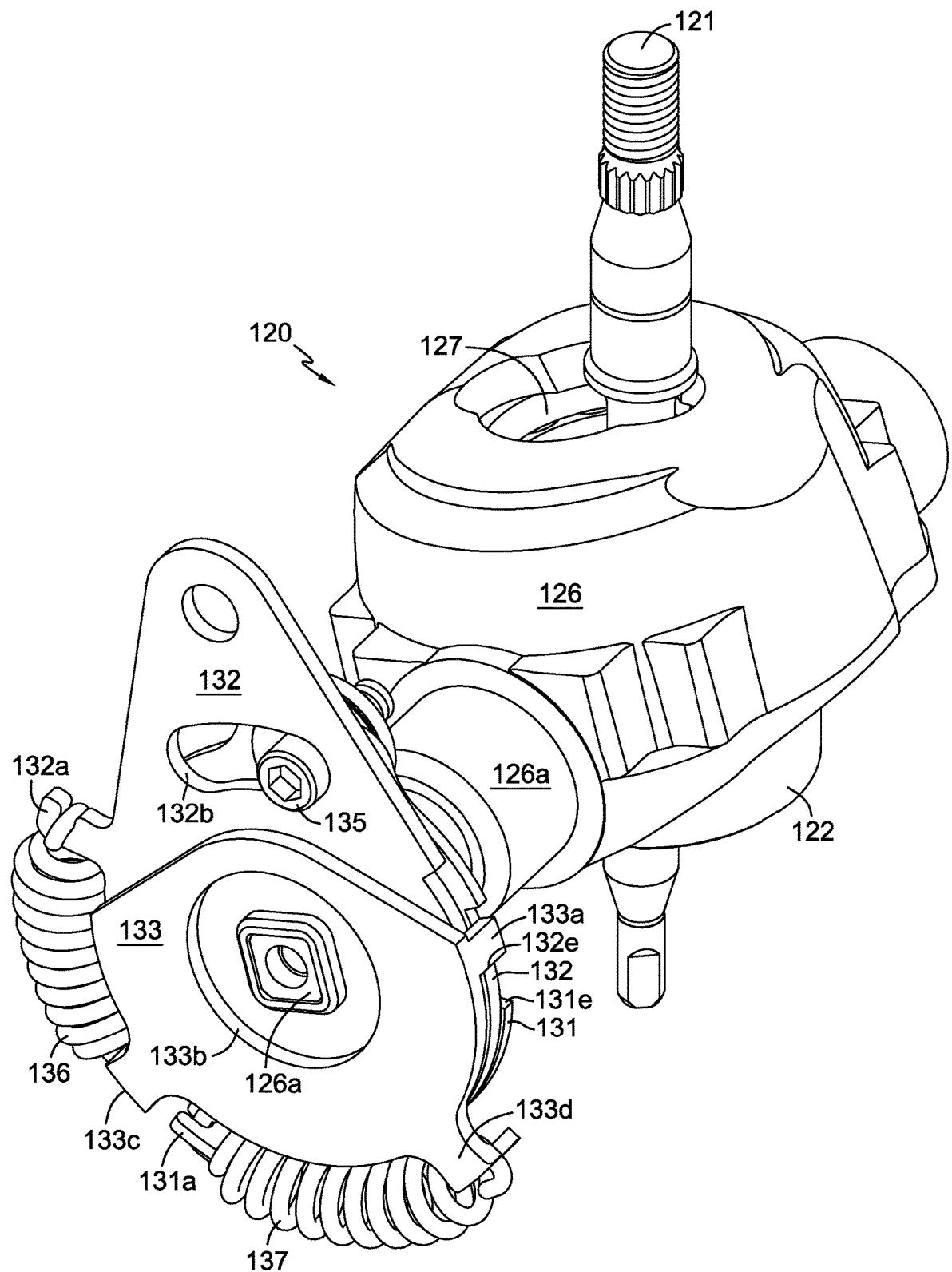
FIG. 9 is a perspective view of the components shown in FIG. 5, with the control arm of the RTN mechanism in the reverse position.

During assembly, control arm 132 is installed on trunnion shaft 126a with the neutral lockdown plate 131 positioned between control arm 132 and housing 116, the trunnion shaft 126a passing through opening 131c of neutral lockdown plate 131 prior to engaging the tapered-square opening 132c of control arm 132. It should be noted that because of the limited range of angular rotation available to swash plate 126 away from its neutral position (which corresponds roughly to the horizontal orientation of swash plate 126 and thrust bearing 127 shown in FIG. 2), neutral lockdown plate 131 is initially positioned about trunnion shaft 126a with opening 131b at the top (i.e. oriented in the same vertical direction as input shaft 121 and roughly aligned with boss 116b). Neutral set screw 135, with its attendant washer and spacer, can be installed loosely to aid assembly at this point. Next, control arm 132 is initially positioned on trunnion shaft 126a with opening 132b at the top. Opening 132b, which is arcuate in shape, accommodates the head of neutral set screw 135 and permits control arm 132 to rotate with trunnion shaft 126a through its limited range of travel, as shown in FIGS. 5, 7, and 9. Return plate 133 is next positioned adjacent to control arm 132. Pilot 134a of cover 134, shown in FIG. 4, fits into opening 133b of return plate 133 such that return plate 133 is rotationally supported on pilot 134a. Cover 134 has a spring groove 134b to provide retention and clearance for springs 136 and 137; the spring groove 134b may be arcuate in shape. A first spring 136 is linked between catch 133c of return plate 133 and catch 132a of control arm 132. A second spring 137 is linked between catch 133d of return plate 133 and catch 131a of neutral lockdown plate 131. Thus, both first spring 136 and second spring 137 move along the aforementioned arc of spring groove 134b. Once the components are mounted on trunnion shaft 126a and secured thereto with mounting screw 138, control arm 132 is rotated until swash plate 126 is in its neutral position, as shown in FIG. 5. Such an operation is preferably performed on an automated test stand, wherein the functionality of hydrostatic transaxle 115 may be confirmed and neutral set; neutral being defined as the absence of rotation of axle shaft 117. First spring 136 and second spring 137 cooperate to retain the components of RTN mechanism 130 in a single, rigid structure, permitting its collective rotation during the neutral set process.

Figure 6:
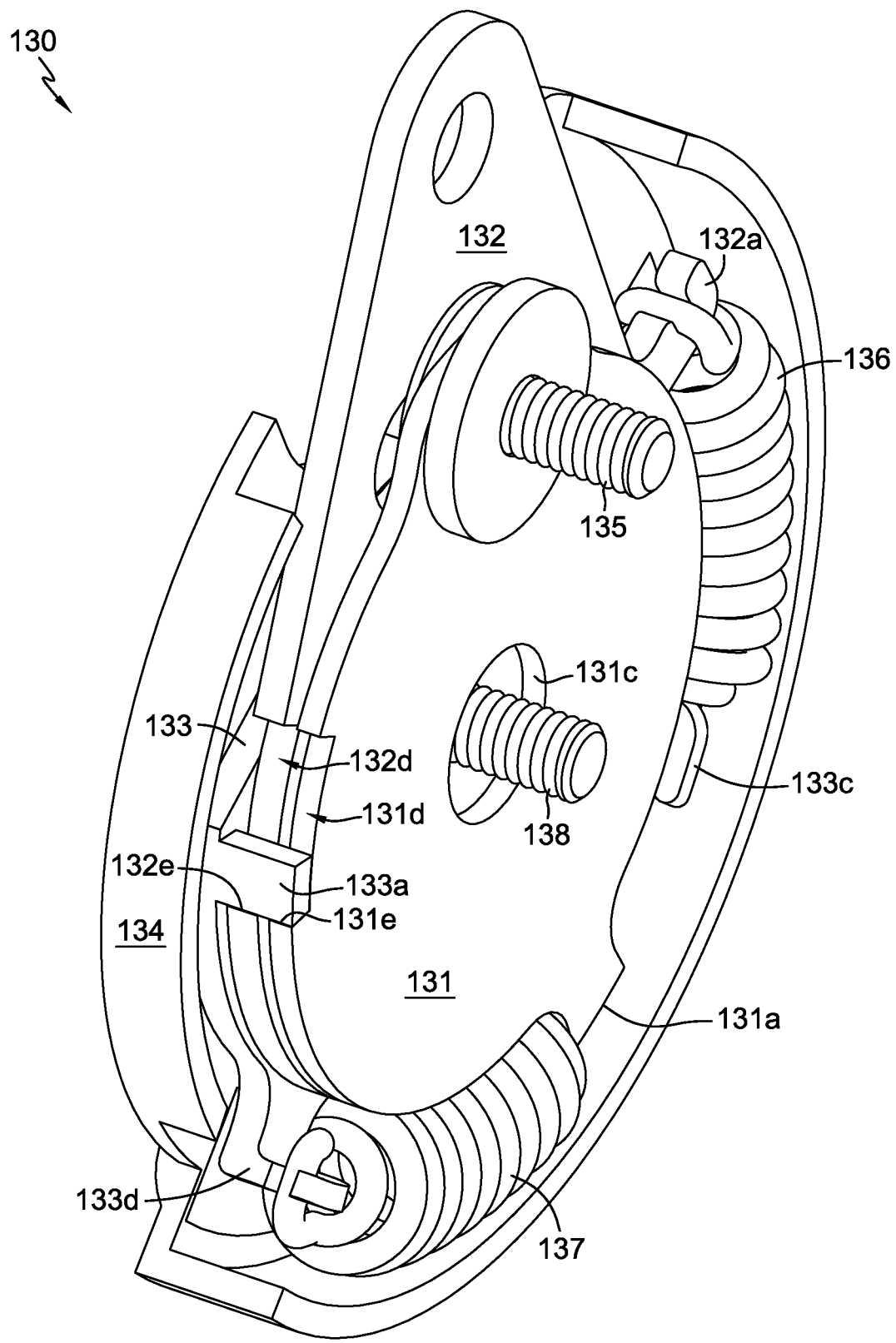
FIG. 6 is a perspective view of the RTN mechanism shown in FIG. 5 rotated 90°, with the RTN cover and mounting screw included.

With swash plate 126 rotated to the neutral position, installation of neutral set screw 135 can be completed, thereby securing neutral lockdown plate 131 to boss 116b to prevent movement of neutral lockdown plate 131. With the neutral position established, and in the absence of any force applied by a control linkage to control arm 132, notch 131d of lockdown plate 131 aligns with notch 132d of control arm 132, as shown in FIGS. 5 and 6. This alignment is indicative of the neutral position, wherein hydraulic pump assembly 120 has been set to or subsequently returned to a zero displacement condition. In the neutral position, a first (lower) edge 131e of notch 131d and a first (lower) edge 132e of notch 132d both engage the return tab 133a of return plate 133. Specifically, return tab 133a is brought into contact with the first edge 131e of notch 131d (a rotational stop) under the influence of second spring 137, and the first edge 132e of notch 132d is brought in contact with return tab 133a under the influence of first spring 136. Thus, the spring forces cooperate to maintain the neutral alignment of notch 132d with notch 131d. It is this design feature that produces positive contact between RTN mechanism components and minimizes any hysteresis associated with component tolerances.

It should be noted that the arcuate opening 132b formed in control arm 132 to accommodate the head of the neutral set screw 135 can be dimensioned to serve as a (secondary) stroke limiter to protect the internal components of hydrostatic transaxle 115. In the event that the neutral set screw 135 is loosened and neutral lockdown plate 131 no longer holds its alignment, and as a result the associated (primary) stroke limiting features described herein below also become misaligned, the sides of arcuate opening 132b will limit the forward and reverse stroke of control arm 132 upon contacting neutral set screw 135.

When force is applied to control arm 132 through a control linkage (not shown) such that control arm 132 is rotated in a first or forward direction as depicted in FIGS. 7 and 8, return tab 133a bears upon the first edge 131e of notch 131d such that return plate 133 is prevented from rotating and first spring 136 is placed under increasing tension. As can be seen in FIG. 7, the forward rotation of control arm 132 causes trunnion shaft 126a to similarly rotate and thereby rotate swash plate 126 in the forward direction. This forward rotation causes the hydraulic pump assembly 120 to displace hydraulic fluid and rotate the hydraulic motor assembly to drive axle shaft 117 in a first or forward direction. Hydraulic pump assembly 120 has a forward stroke limitation, wherein a second (upper) edge 132f of notch 132d comes into contact with return tab 133a. Once the applied force is removed from control arm 132, first spring 136 will cause control arm 132 to rotate back toward neutral until first edge 132e bears against return tab 133a. Therefore, as a result of removing the applied force from control arm 132, trunnion shaft 126a and swash plate 126 are returned to the neutral position shown in FIG. 5 and transaxle 115 is returned to a neutral condition.

Figure 10:
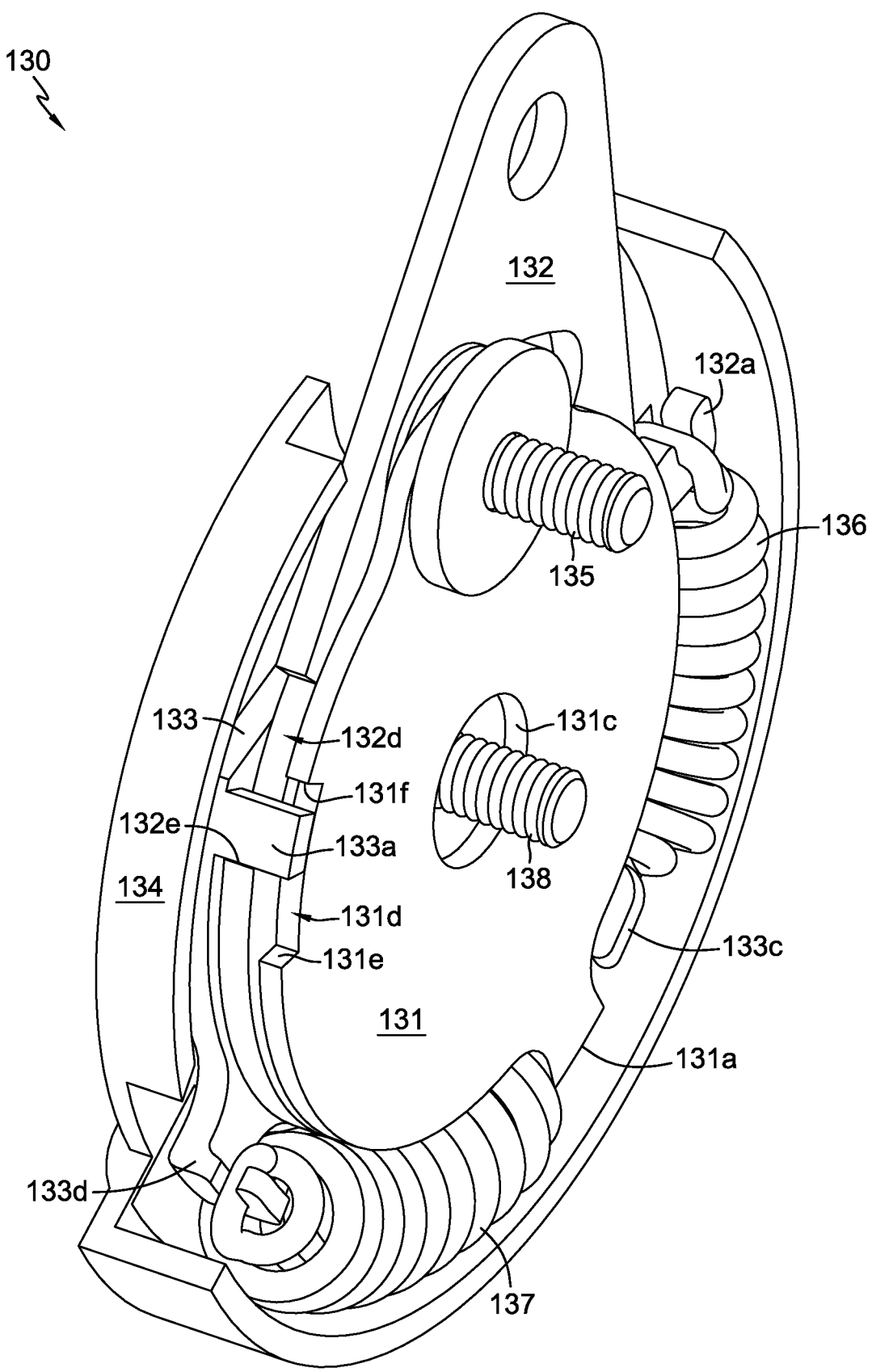
FIG. 10 is a perspective view of the RTN mechanism shown in FIG. 9 rotated 90°, with the RTN cover and mounting screw included.

When force is applied to control arm 132 in an opposite rotational sense, such that control arm 132 is rotated in a second or 'reverse' direction, spring 136 causes the first edge 132e of notch 132d to remain in contact with return tab 133a such that control arm 132 and return plate 133 rotate together as shown in FIGS. 9 and 10. The rotation of control arm 132 causes trunnion shaft 126a to similarly rotate and thereby rotate swash plate 126 in the reverse direction. This rotational movement places second spring 137 under increasing tension. This rearward rotation causes the hydraulic pump assembly 120 to displace hydraulic fluid and rotate the hydraulic motor assembly to drive axle shaft 117 in a second or reverse direction. Hydraulic pump assembly 120 has a reverse stroke limitation, wherein return tab 133a comes into contact with a second (upper) edge 131f of notch 131d. Once the applied force is removed from control arm 132, second spring 137 will cause return plate 133 and control arm 132 to collectively rotate back toward neutral until return tab 133a again bears against first edge 131e. As a result, trunnion shaft 126a and swash plate 126 are returned to the neutral position shown in FIG. 5 and transaxle 115 is returned to neutral condition.

In an alternative embodiment (not specifically illustrated), one of the springs can be omitted from RTN mechanism 130. This alternative embodiment enables the user to provide the return to neutral feature in one direction only, referred to as a unidirectional RTN mechanism. Specifically, if first spring 136 is omitted from RTN mechanism 130, the resulting RTN mechanism will return transaxle 115 to a neutral condition when the force applied to rotate control arm 132 in a reverse direction is removed, but not when the force applied to move control arm 132 in a forward direction is removed. Conversely, if second spring 137 is omitted instead of first spring 136, the resulting RTN mechanism will return transaxle 115 to a neutral condition when the force applied to move control arm 132 in a forward direction is removed, but not when the force applied to move control arm 132 in a reverse direction is removed. In a further variation, the spring rates of first spring 136 and second spring 137 can differ, permitting different rates of return to neutral, or as previously noted, helping to alleviate operator fatigue in the predominant direction of operation.

While RTN mechanism 130 is depicted herein in conjunction with a hydrostatic transaxle, it could be used with other hydraulic apparatus having rotatable control shafts and variable displacement pumps. Such other hydraulic apparatus include, without limitation, stand-alone hydrostatic pumps, such as axial piston and radial piston pumps, and hydrostatic transmissions having an axial piston pump and a hydraulic motor (whether axial piston or gerotor). In addition, RTN mechanism 130 may be used with other types of variable drive apparatus having a rotatable control shaft, such as toroidal, friction, or other like drives.

Figure 11:
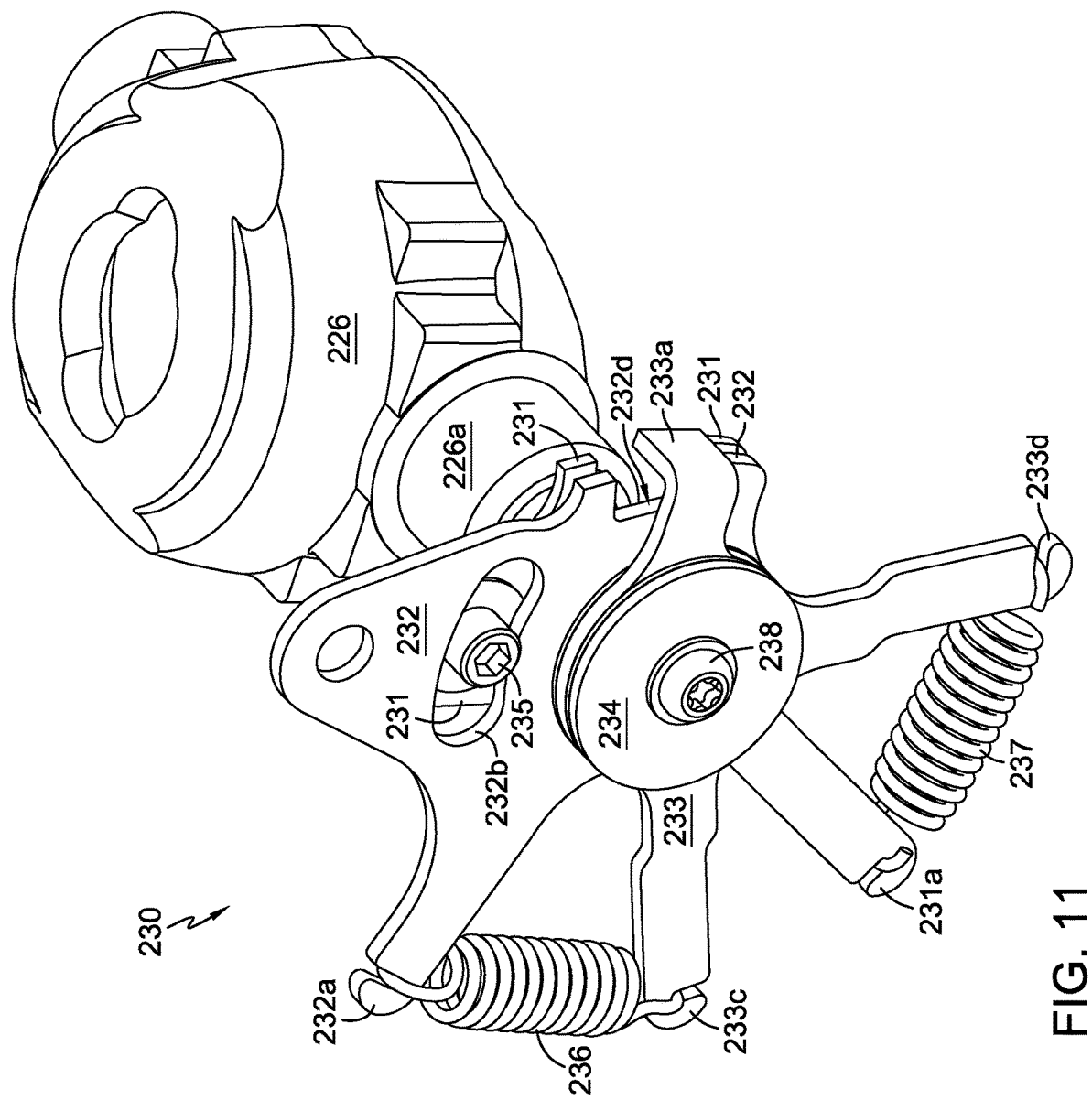
FIG. 11 is a perspective view of a second embodiment of an RTN mechanism, mounted on the trunnion shaft of a swash plate.
Figure 12:
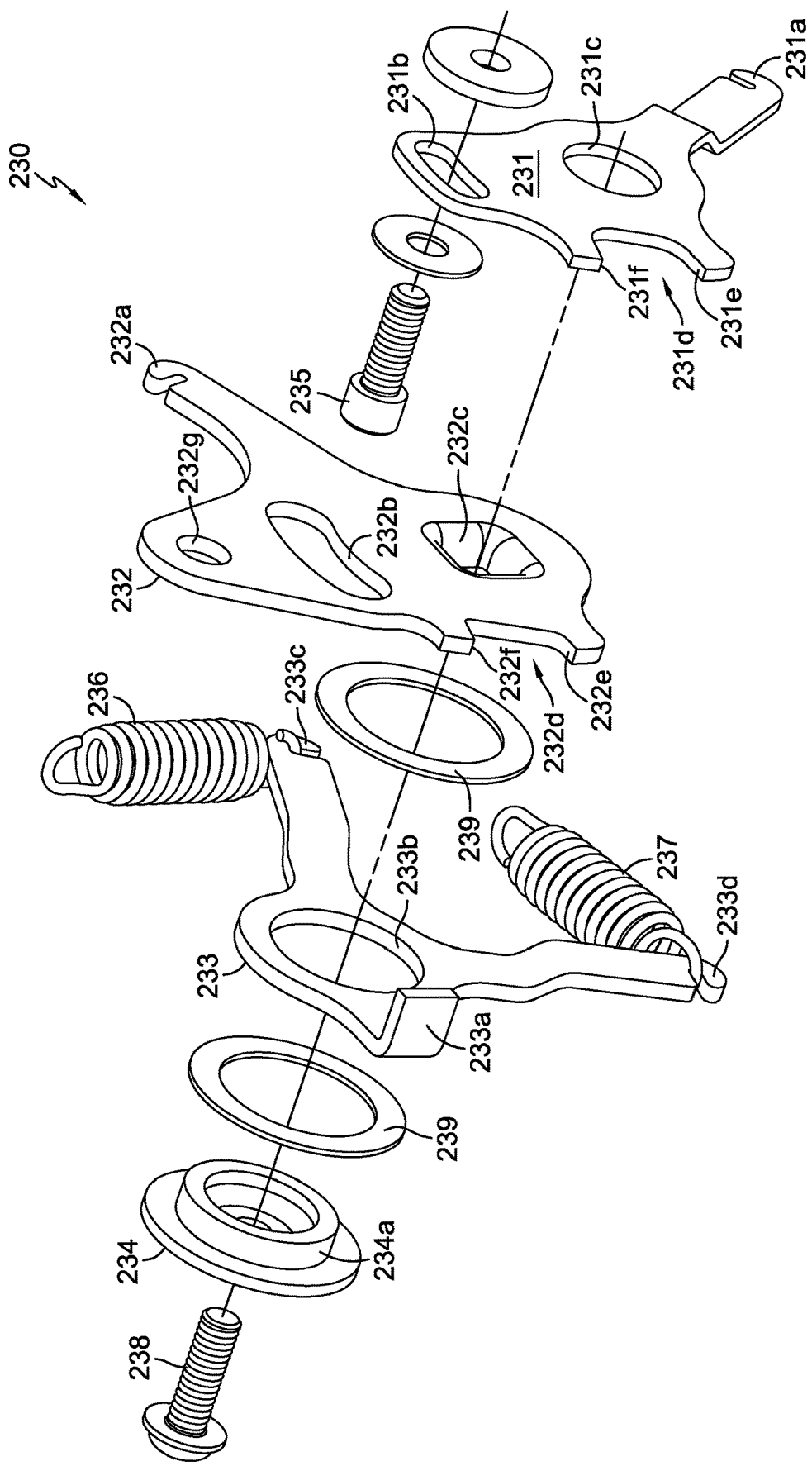
FIG. 12 is an exploded view of the RTN mechanism shown in FIG. 11.

FIGS. 11 and 12 depict a second embodiment, where RTN mechanism 230 is similar to RTN mechanism 130 in many respects. RTN mechanism 230 incorporates a neutral lockdown plate 231 adapted to be secured to the housing of a hydraulic apparatus and disposed about a rotatable control shaft, e.g. trunnion shaft 226a; a control arm 232 fixed to the control shaft to impart rotation thereto; a single, rotatable return arm 233 piloted upon a 'top hat' cover 234; and a pair of springs 236, 237 to bias the control shaft back to a neutral position from either a forward or reverse rotation. However, RTN mechanism 230 varies from RTN mechanism 130 in that it includes a washer 239 on each side of return arm 233, each disposed about pilot 234a to ensure the free rotational movement of return arm 233. Further, cover 234 is substantially smaller than cover 134, no longer requiring a groove to help retain a first spring 236 and second spring 237 about an arc, as they are linearly disposed between corresponding catches, 232a, 233c and 231a, 233d, respectively. In addition, the shapes of return arm 233, control arm 232 and neutral lockdown plate 231 differ from the corresponding structures of RTN mechanism 130, being representative of a material savings. Otherwise, the structure and operation of RTN mechanism 230 is similar to the structure and operation of RTN mechanism 130, relying upon the interaction of return arm tab 233a and notches 231d, 232d to rotate the control shaft of a hydraulic apparatus back to its neutral position. As observed with RTN mechanism 130, the structure of RTN mechanism 230 produces positive contact between RTN mechanism components and minimizes any hysteresis associated with component tolerances. In an alternative embodiment (not specifically illustrated), one of the springs 236, 237 can be omitted to make RTN mechanism 230 unidirectional, as described above. In a further variation, the spring rates of first spring 236 and second spring 237 can differ, permitting different rates of return to neutral, or as previously noted, helping to alleviate operator fatigue in the predominant direction of operation.

Figure 13:
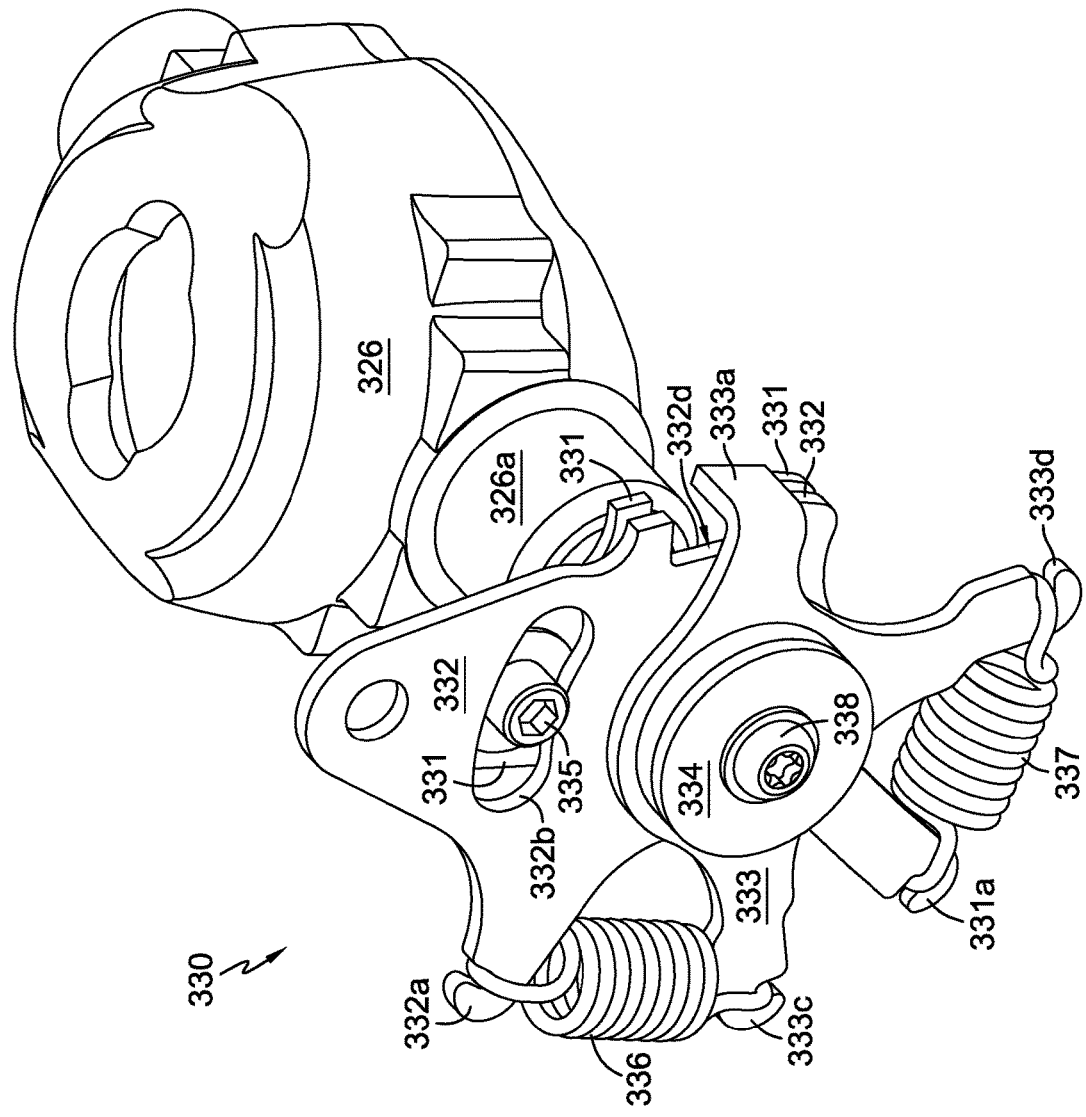
FIG. 13 is a perspective view of a third embodiment of an RTN mechanism, mounted on the trunnion shaft of a swash plate.
Figure 14:
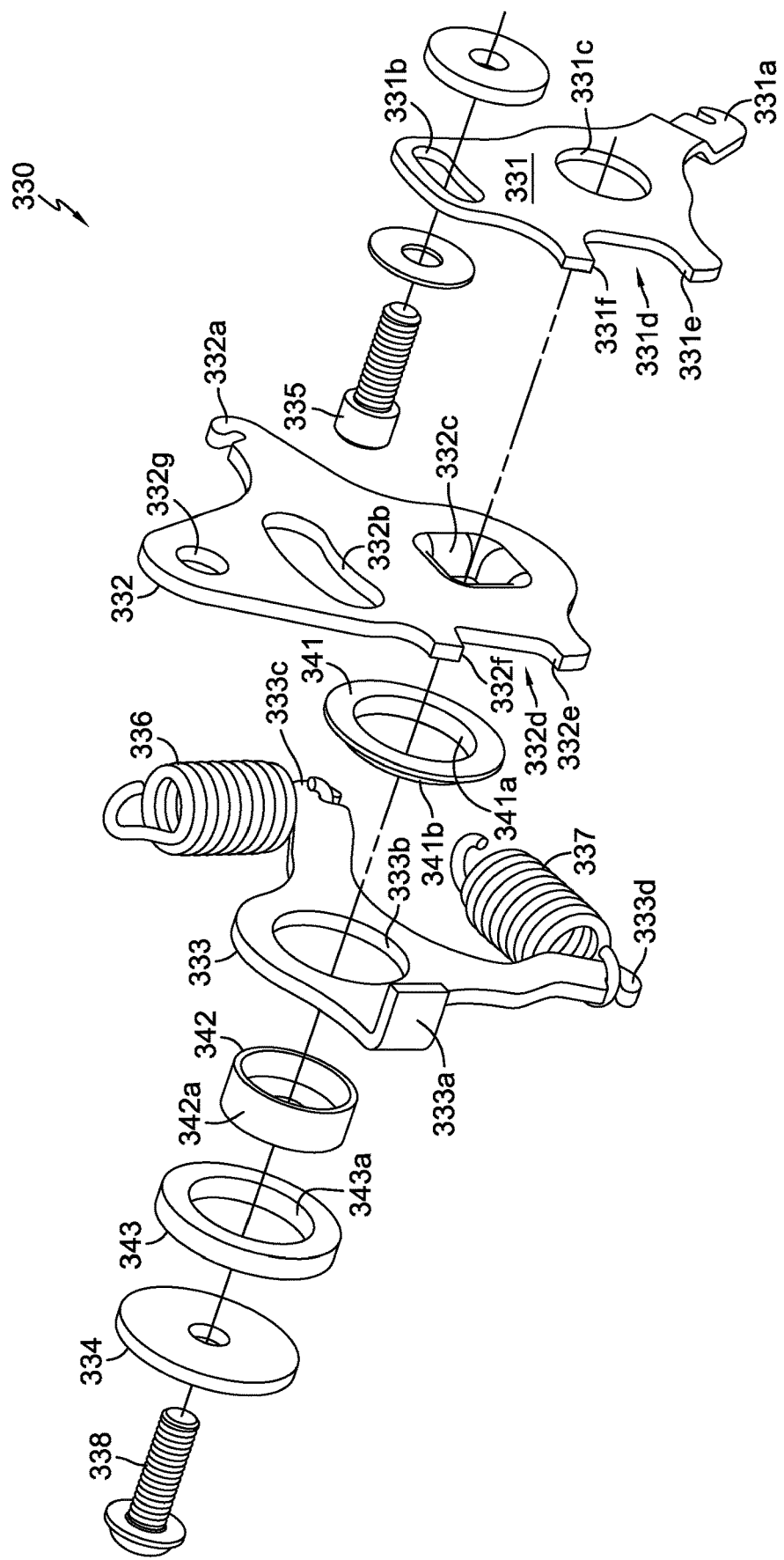
FIG. 14 is an exploded view of the RTN mechanism shown in FIG. 13.

FIGS. 13 and 14 depict a third embodiment, where RTN mechanism 330 is similar to RTN mechanism 230 in most respects. RTN mechanism 330 incorporates a neutral lockdown plate 331 adapted to be secured to the housing of a hydraulic apparatus and disposed about a rotatable control shaft, e.g. trunnion shaft 326a; a control arm 332 fixed to the control shaft to impart rotation thereto; a single, rotatable return arm 333; and a pair of springs 336, 337 to bias the control shaft back to a neutral position from either a forward or reverse rotation. However, RTN mechanism 330 varies from RTN mechanism 230 in that it omits washers 239 and includes an inner spacer 341, a bushing 342 and an outer spacer 343 to rotationally support return arm 333. Bushing 342 is mounted on trunnion shaft 326a and supports both inner spacer 341 and outer spacer 343; bushing 342 having a bearing surface 342a in contact with surface 341a of inner spacer 341 and surface 343a of outer spacer 343. Inner spacer 341 has a pilot 341b formed thereon that serves as a bearing surface to rotationally support return arm 333. Cover 334 is flat and has no structure corresponding to pilot 234b of cover 234. It should also be noted that RTN mechanism 330 is depicted as having stronger, more compact springs 336, 337 than prior embodiments in order to reduce its overall size. In applying the principles of the invention, it is to be understood that the distance of the RTN mechanism's catches from the rotatable control shaft (i.e. the length of the lever arm) and the spring rates of the two springs can be adjusted to overcome the particular control moments of the target hydraulic apparatus. Otherwise, the structure and operation of RTN mechanism 330 is similar to the structure and operation of RTN mechanism 230, relying upon the interaction of return arm tab 333a and notches 331d, 332d to rotate the control shaft of a hydraulic apparatus back to its neutral position. As observed with RTN mechanisms 130 and 230, the structure of RTN mechanism 330 produces positive contact between RTN mechanism components and minimizes any hysteresis associated with component tolerances. In an alternative embodiment (not shown), one of springs 336 and 337 can be omitted to make RTN mechanism 330 unidirectional, as described above. In a further variation, the spring rates of first spring 336 and second spring 337 can differ, permitting different rates of return to neutral, or as previously noted, helping to alleviate operator fatigue in the predominant direction of operation.

Figure 15:
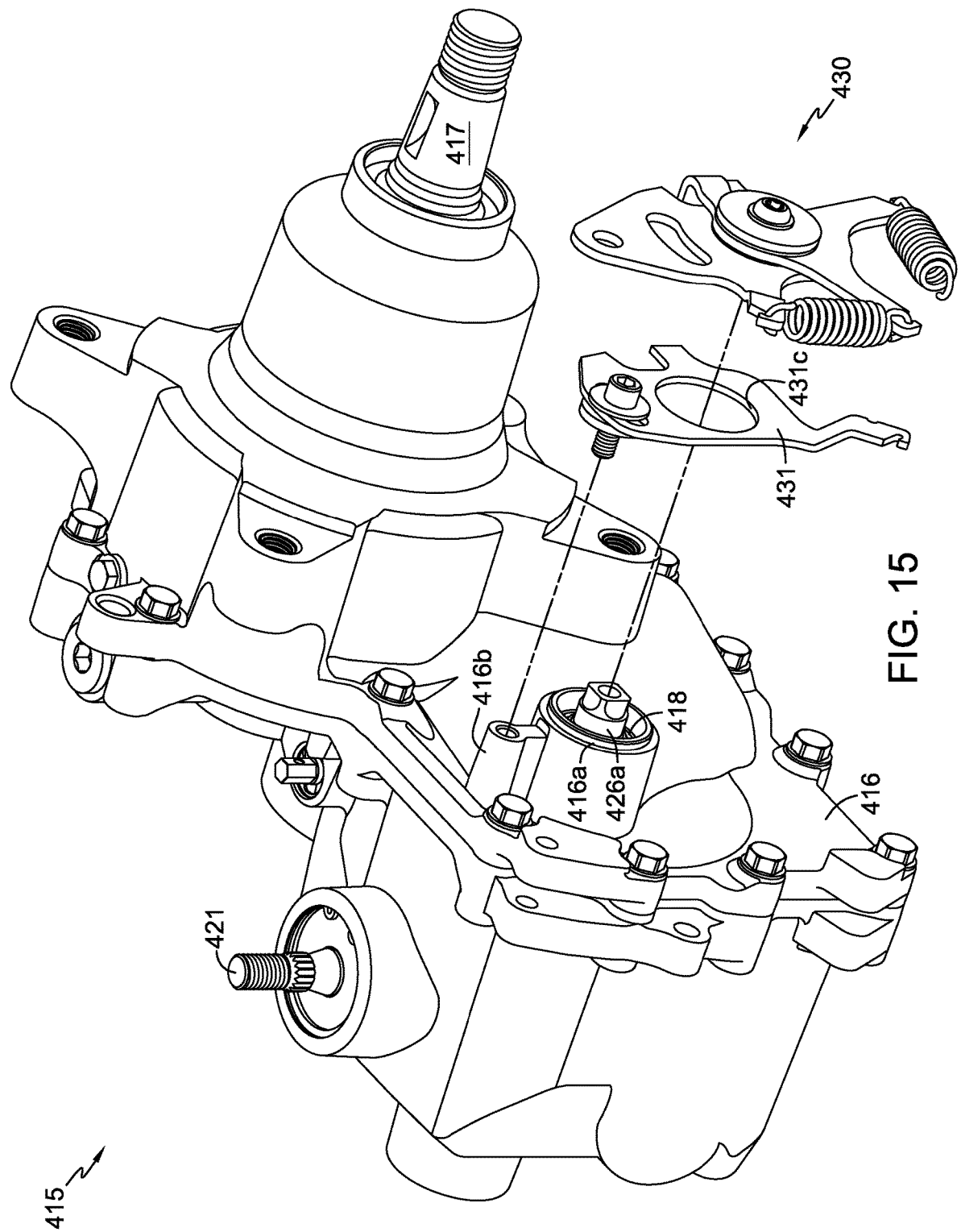
FIG. 15 is a perspective view of a representative hydrostatic transmission having a fourth embodiment of an RTN mechanism, wherein the RTN mechanism is partially exploded.
Figure 16:
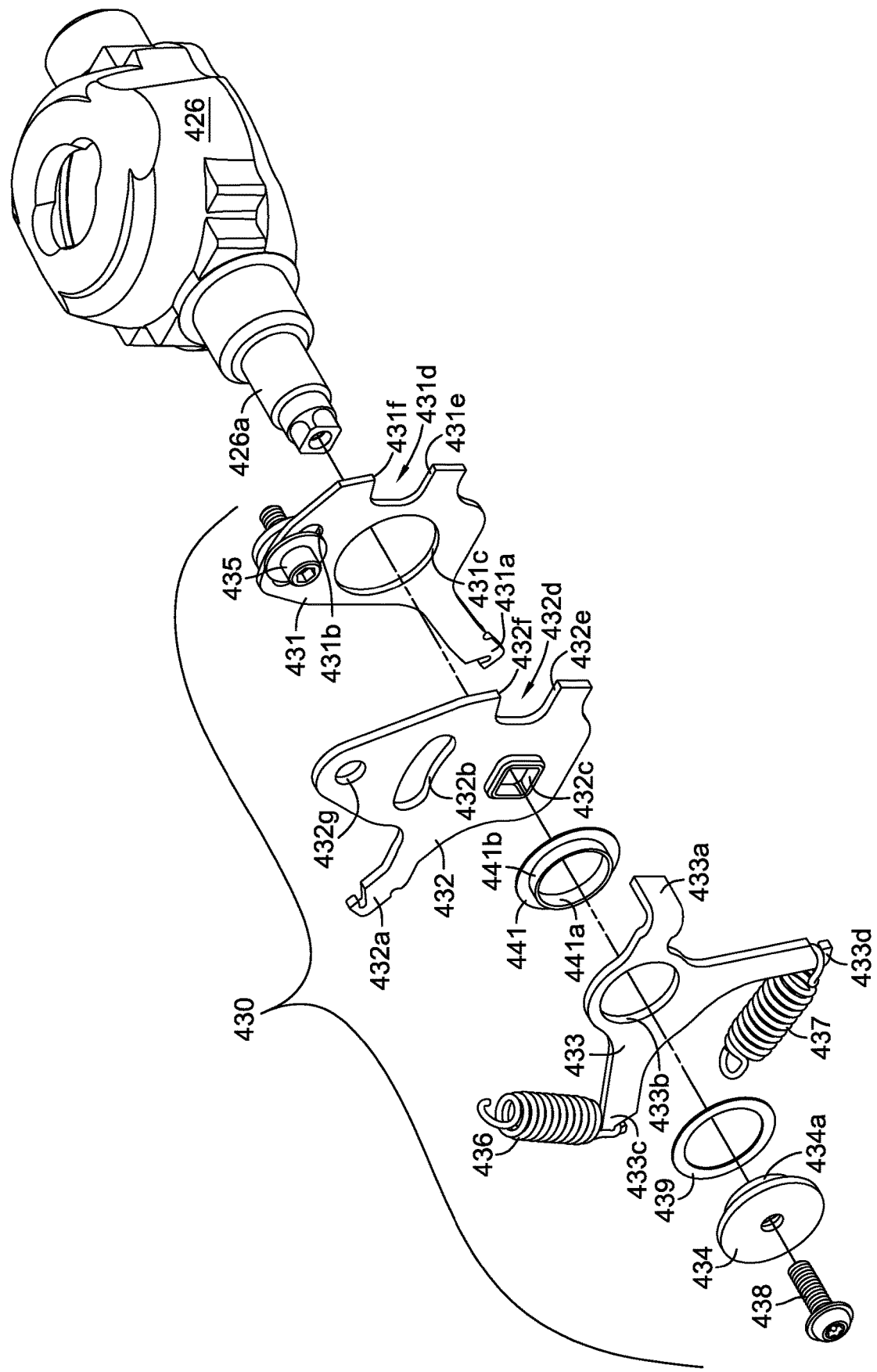
FIG. 16 is an exploded view of the RTN mechanism shown in FIG. 15, with the swash plate of the representative hydrostatic transmission included for spatial reference.

FIGS. 15 and 16 depict a fourth embodiment, where RTN mechanism 430 is similar to RTN mechanisms 230 and 330 in many respects. RTN mechanism 430 incorporates a neutral lockdown plate 431 adapted to be secured to the housing of a hydraulic apparatus and disposed about a rotatable control shaft, e.g. trunnion shaft 426a; a control arm 432 fixed to the control shaft to impart rotation thereto; a single, rotatable return arm 433 supported upon a combination of inner spacer 441, washer 439, and 'top hat' cover 434; and a pair of springs 436, 437 to bias the control shaft back to a neutral position from either a forward or reverse rotation. However, RTN mechanism 430 varies from the prior embodiments in the manner in which return arm 433 is rotatably supported about trunnion shaft 426a; and most importantly, the manner in which neutral lockdown plate 431 is piloted. Inner spacer 441 has an integral pilot 441b that serves as a bearing surface for the inner surface 433b of return arm 433 to rotate upon. A "top hat" cover 434 has a pilot 434a that receives washer 439 and is correspondingly received by an inner surface 441a of inner spacer 441. As a result, return arm 433 is sandwiched therebetween to rotate freely about trunnion arm 426a. Neutral lockdown plate 431, as opposed to being piloted directly upon trunnion shaft 426a, has an inner surface 431c that rides upon a pilot 416a formed on housing 416 about trunnion shaft 426a. As a result, any repairs to the trunnion shaft seal 418 of hydrostatic transaxle 415 or repairs in which housing 416 must be opened, do not require removal of the factory set neutral lockdown plate 431, merely removal of the remaining components of RTN mechanism 430. Otherwise, the structure and operation of RTN mechanism 430 is similar to the structure and operation of RTN mechanisms 230 and 330, relying upon the interaction of return arm tab 433a and notches 431d, 432d to rotate the control shaft of a hydraulic apparatus back to its neutral position. As observed with RTN mechanisms 130, 230 and 330, the structure of RTN mechanism 430 produces positive contact between RTN mechanism components and minimizes any hysteresis associated with component tolerances. In an alternative embodiment (not shown), one of springs 436 and 437 can be omitted to make RTN mechanism 430 unidirectional, as described above. In a further variation, the spring rates of first spring 436 and second spring 437 can differ, permitting different rates of return to neutral, or as previously noted, helping to alleviate operator fatigue in the predominant direction of operation.

Figure 17:
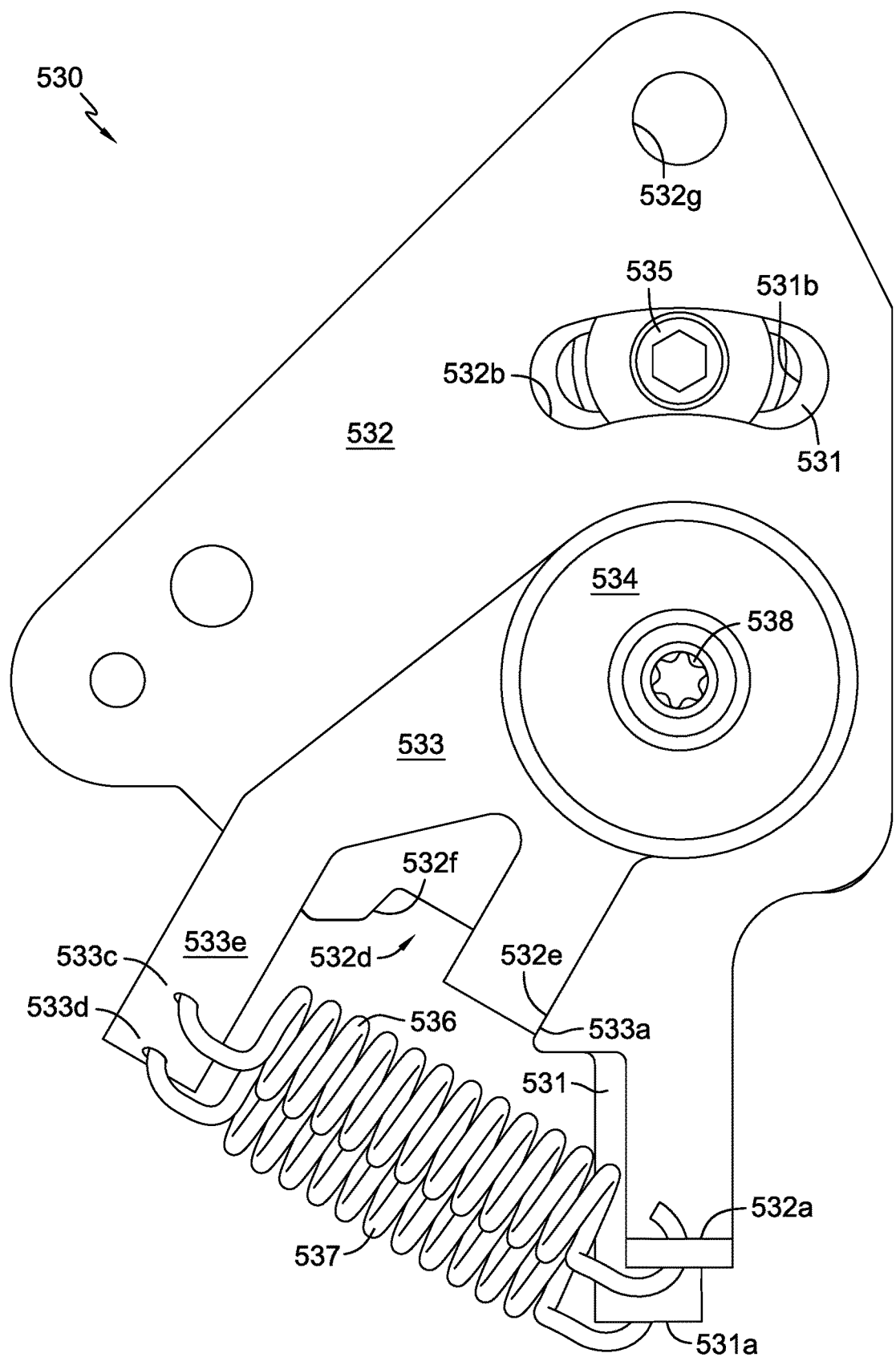
FIG. 17 is an elevational view of a fifth embodiment of an RTN mechanism, with the control arm of the RTN mechanism in the neutral position.
Figure 18:
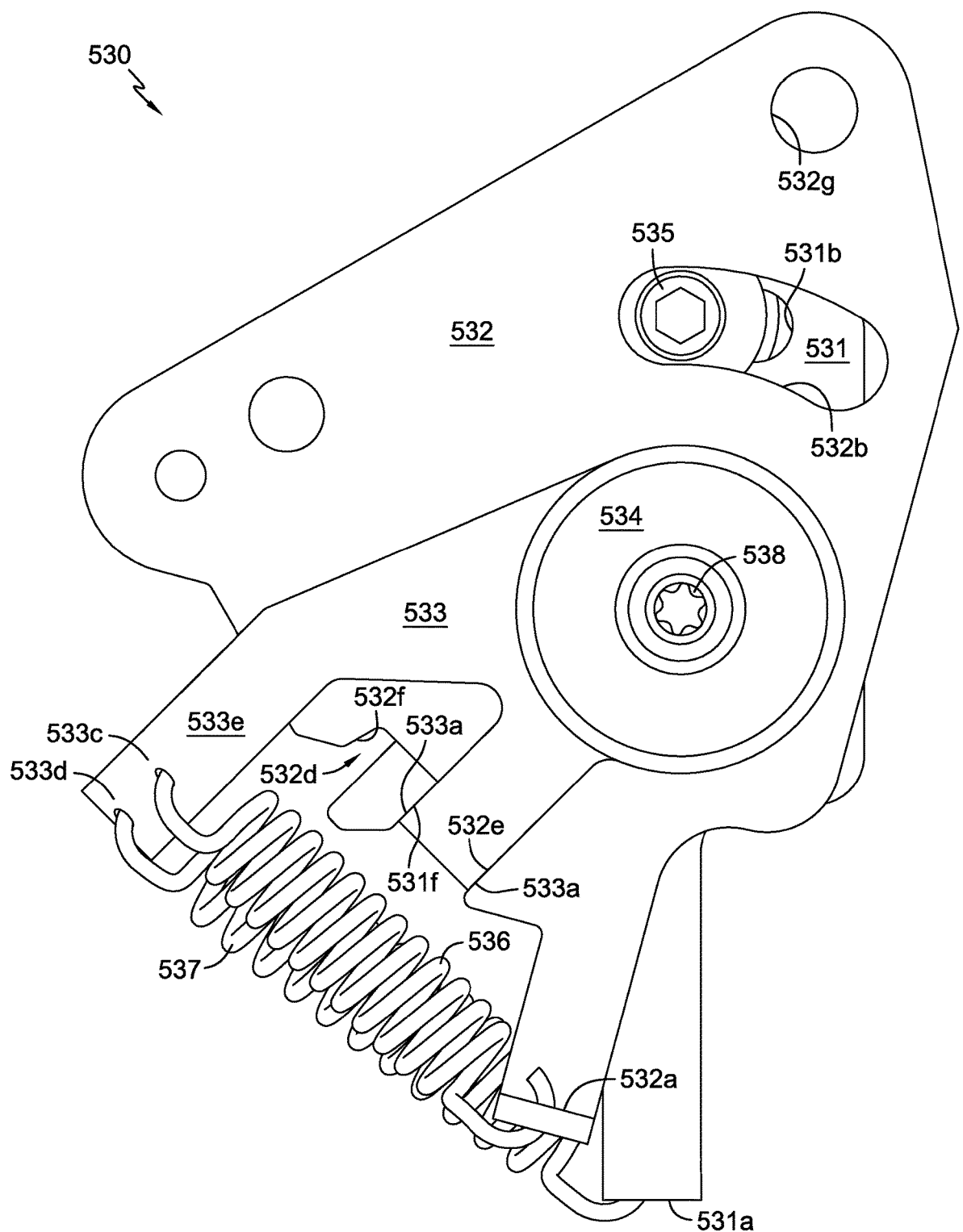
FIG. 18 is an elevational view of the RTN mechanism shown in FIG. 17, with the control arm in the forward position.
Figure 19:
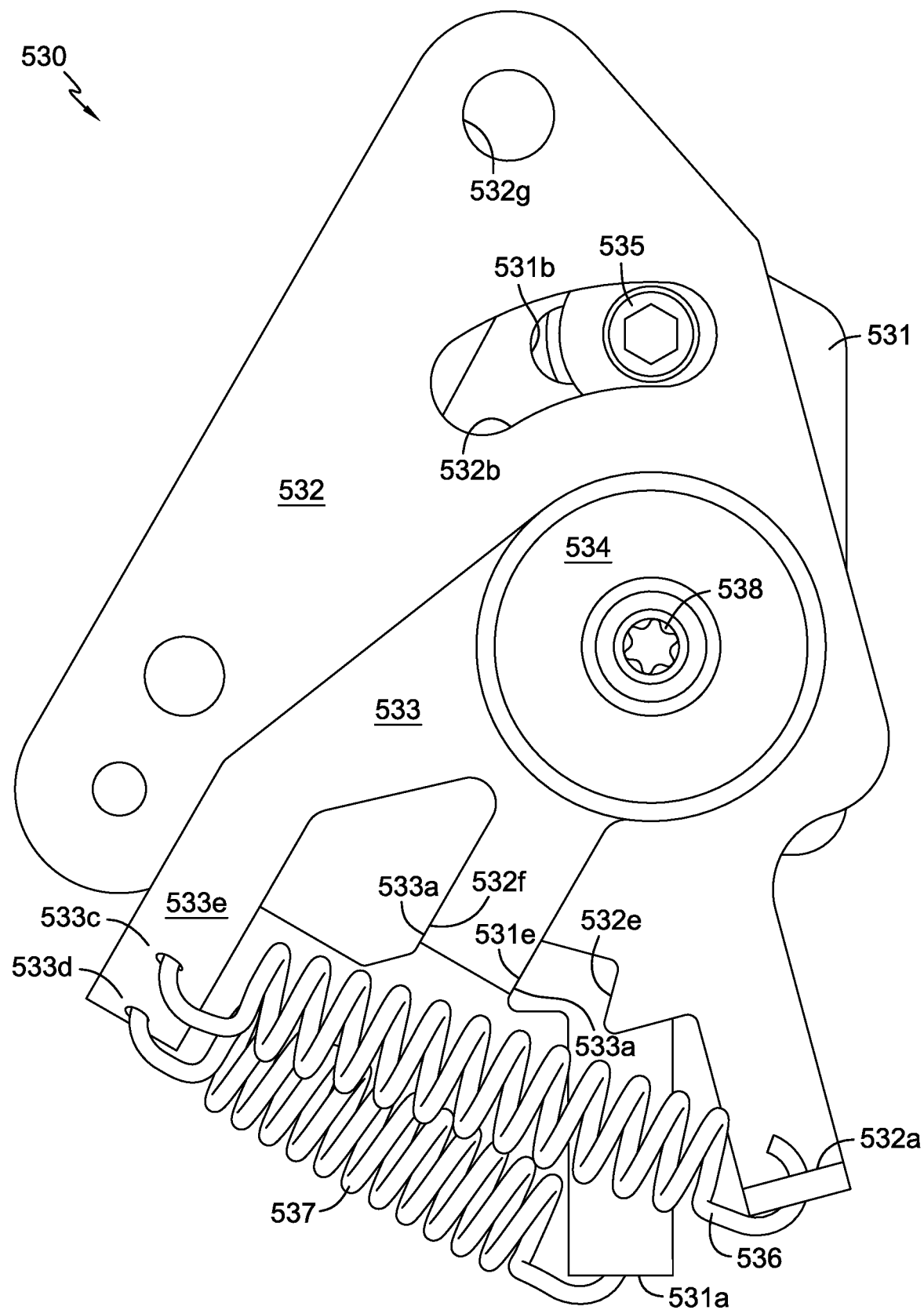
FIG. 19 is an elevational view of the RTN mechanism shown in FIG. 17, with the control arm in the reverse position.
Figure 20:
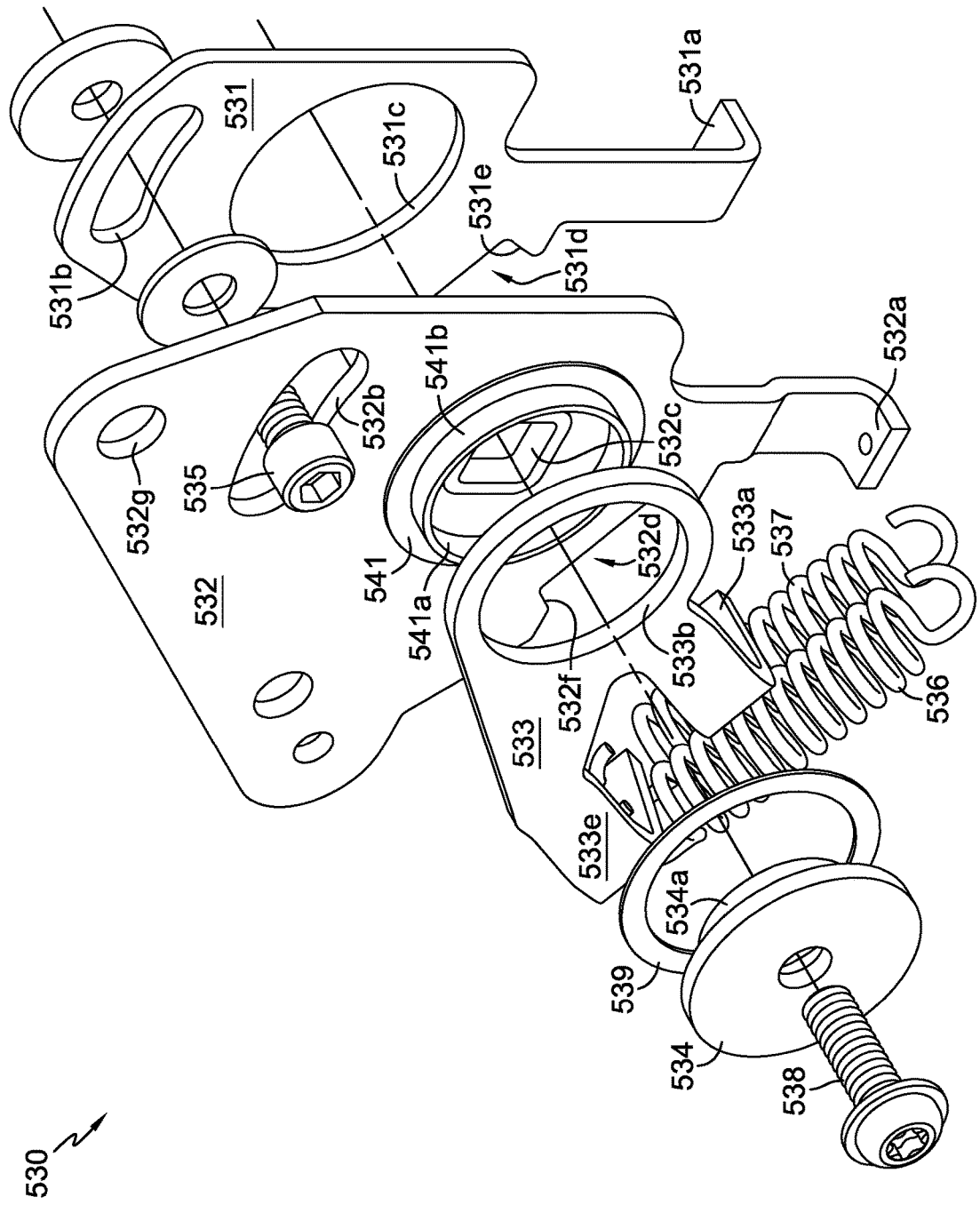
FIG. 20 is an exploded view of the RTN mechanism shown in FIG. 17.

FIGS. 17, 18, 19 and 20 depict a fifth embodiment of an RTN mechanism 530, where RTN mechanism 530 is most similar to RTN mechanism 430. RTN mechanism 530 incorporates a neutral lockdown plate 531 adapted to be secured to the housing of a hydraulic apparatus (such as housing 416 of the hydraulic apparatus 415 shown in FIG. 15) and disposed about a rotatable control shaft (such as trunnion shaft 426a); a control arm 532 fixed to the control shaft to impart rotation thereto; a single, rotatable return arm 533 supported upon a combination of inner spacer 541, washer 539, and 'top hat' cover 534 akin to those supporting return arm 433; and a pair of springs 536, 537 to bias the control shaft back to a neutral position from either a forward or reverse rotation. Neutral lockdown plate 531 also has an inner surface 531c configured to ride upon a housing pilot in the manner of neutral lockdown plate 431. RTN mechanism 530 varies primarily in the compact arrangement of the springs 536, 537, which is achieved by the attachment of one end of each of these springs to a common spring catch arm 533e formed on return arm 533. Otherwise, the structure and operation of RTN mechanism 530 is similar to the structure and operation of RTN mechanisms 230, 330 and 430, relying upon the interaction of return arm tab 533a and notches 531d, 532d to rotate the control shaft of a hydraulic apparatus back to its neutral position. FIG. 17 shows RTN mechanism 530 in a neutral position, FIG. 18 shows RTN mechanism 530 in a first or forward position, and FIG. 19 shows RTN mechanism 530 in a second or reverse position. As observed with RTN mechanisms 130, 230, 330 and 430, the structure of RTN mechanism 530 produces positive contact between RTN mechanism components and minimizes any hysteresis associated with component tolerances. In an alternative embodiment (not shown), one of springs 536 and 537 can be omitted to make RTN mechanism 530 unidirectional, as described above. In a further variation, the spring rates of first spring 536 and second spring 537 can differ, permitting different rates of return to neutral, or as previously noted, helping to alleviate operator fatigue in the predominant direction of operation.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A return to neutral mechanism for use in connection with a hydraulic apparatus having a housing and a control shaft extending therefrom, the control shaft rotatable in a first direction away from a neutral position causing forward displacement and rotatable in a second direction away from the neutral position causing reverse displacement, the return to neutral mechanism comprising:
- a neutral lockdown plate secured to the housing of the hydraulic apparatus and disposed about the control shaft;
- a return arm rotationally disposed about the control shaft, the return arm having a center opening through which the control shaft extends;
- a control arm engaged to the control shaft to impart rotation thereto, wherein the control arm is disposed between the neutral lockdown plate and the return arm; and
- a first pilot, wherein the center opening of the return arm is disposed about the first pilot and the return arm is rotatable about the first pilot;
- a first spring having a first end directly connected to the neutral lockdown plate and a second end directly connected to the return arm, wherein application of a first force to the control arm to impart rotation of the control shaft in the second direction increases tension in the first spring, and wherein the first spring applies a first spring return force to return the control shaft to the neutral position upon removal of the first force; and
- a second spring having a first end directly connected to the control arm and a second end directly connected to the return arm, wherein application of a second force to the control arm to impart rotation of the control shaft in the first direction increases tension in the second spring, and wherein the second spring applies a second spring return force to return the control shaft to the neutral position upon removal of the second force.

2. The return to neutral mechanism of claim 1, wherein the return arm comprises a first arm extension to which the second end of the first spring is attached and a second arm extension to which the second end of the second spring is attached.

3. The return to neutral mechanism of claim 1, wherein the return arm comprises a single arm extension to which both the second end of the first spring and the second end of the second spring are attached.

4. The return to neutral mechanism of claim 1, wherein the neutral lockdown plate is piloted upon the housing.

5. The return to neutral mechanism of claim 1, wherein the neutral lockdown plate is piloted upon the control shaft.

6. The return to neutral mechanism of claim 1, wherein the control shaft extends from a swash plate disposed in the housing.

7. The return to neutral mechanism of claim 1, further comprising a cover, wherein the cover comprises:
- a cover member having the first pilot, the cover member being disposed on a first side of the return arm; and
- the return to neutral mechanism further comprises a spacer having a second pilot, the spacer being disposed on a second side of the return arm, opposite the first side, wherein the first pilot and the second pilot both extend into the center opening of the return arm, and the return arm is piloted on the first pilot and the second pilot.

8. The return to neutral mechanism of claim 7, wherein the first pilot comprises a bushing formed separate from the cover.

9. The return to neutral mechanism of claim 7, further comprising a fastener engaged to an external surface of the cover and extending through the cover to directly connect to the control shaft, whereby the cover is connected to the control shaft.

10. A return to neutral mechanism for use in connection with a hydraulic apparatus having a housing, an input shaft extending into the housing and at least one output axle extending out one side of the housing, and a control shaft extending from the housing, the control shaft rotatable in a first direction away from a neutral position causing forward displacement and rotatable in a second direction away from the neutral position causing reverse displacement, the return to neutral mechanism comprising:
- a neutral lockdown plate secured to the housing and disposed about the control shaft;
- a return arm rotationally disposed about the control shaft, the return arm having a center opening through which the control shaft extends;
- a control arm engaged to the control shaft to impart rotation thereto, wherein the control arm is disposed between the neutral lockdown plate and the return arm;
- a pilot extending into the center opening of the return arm, wherein the return arm is piloted on the pilot; and
- a first spring having a first end directly connected to the control arm and a second end directly connected to the return arm, wherein application of a first force to the control arm to impart rotation of the control shaft in the first direction increases tension in the first spring, and wherein the first spring acts to return the control shaft to the neutral position upon removal of the first force.

11. The return to neutral mechanism of claim 10, further comprising a second spring engaged to the neutral lockdown plate and the return arm, wherein application of a second force to the control arm to impart rotation of the control shaft in the second direction increases tension in the second spring; and wherein the second spring acts to return the control shaft to the neutral position upon removal of the second force.

12. The return to neutral mechanism of claim 10, wherein the neutral lockdown plate is piloted upon the housing.

13. The return to neutral mechanism of claim 10, further comprising a cover having the pilot formed thereon.

14. The return to neutral mechanism of claim 13, further comprising a fastener engaged to an external surface of the cover and extending through the cover to directly connect to the control shaft whereby the cover is connected to the control shaft.

15. The return to neutral mechanism of claim 14, further comprising a second spring engaged to the neutral lockdown plate and the return arm, wherein application of a second force to the control arm to impart rotation of the control shaft in the second direction increases tension in the second spring; and wherein the second spring acts to return the control shaft to the neutral position upon removal of the second force.

16. A return to neutral mechanism for use in a variable drive apparatus having a control shaft extending from a housing, the control shaft being rotatable in a first direction away from a neutral position causing forward drive of the variable drive apparatus and rotatable in a second direction away from the neutral position causing reverse drive of the variable drive apparatus, the return to neutral mechanism comprising:
- a neutral lockdown plate secured to the housing and disposed about the control shaft;
- a return arm rotationally disposed about the control shaft, the return arm having a center opening through which the control shaft extends;
- a control arm engaged to the control shaft to impart rotation thereto, wherein the control arm is disposed between the neutral lockdown plate and the return arm;

a first pilot disposed on a first side of the return arm and a second pilot disposed on a second side of the return arm, opposite the first side, wherein the first pilot and the second pilot both extend into the center opening of the return arm, and the return arm is piloted on the first pilot and the second pilot; and a first spring having a first end directly connected to the control arm and a second end directly connected to the return arm, wherein application of a first force to the control arm to impart rotation of the control shaft in the first direction increases tension in the first spring.

17. The return to neutral mechanism of claim 16, further comprising a second spring engaged to the neutral lockdown plate and the return arm, wherein application of a second force to the control arm to impart rotation of the control shaft in the second direction increases tension in the second spring; and wherein the second spring acts to return the control shaft to the neutral position upon removal of the second force.

18. The return to neutral mechanism of claim 16, further comprising a cover member on which the first pilot is located, the cover member being disposed on the first side of the return arm; and a spacer having the second pilot disposed thereon, the spacer being disposed on the second side of the return arm.

19. The return to neutral mechanism of claim 18, further comprising a fastener engaged to an external surface of the cover member and extending through the cover member and the spacer to directly connect to the control shaft.

20. The return to neutral mechanism of claim 18, further comprising a second spring engaged to the neutral lockdown plate and the return arm, wherein application of a second force to the control arm to impart rotation of the control shaft in the second direction increases tension in the second spring; and wherein the second spring acts to return the control shaft to the neutral position upon removal of the second force.

* * * * *